(12) United States Patent
Siomina et al.

(10) Patent No.: US 9,648,573 B2
(45) Date of Patent: May 9, 2017

(54) ENHANCING POSITIONING WITH TRANSMIT-TIMING ADJUSTMENT INFORMATION

(71) Applicant: Telefonaktiebolaget L M Ericsson (publ), Stockholm (SE)

(72) Inventors: Iana Siomina, Täby (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/420,407

(22) PCT Filed: May 3, 2013

(86) PCT No.: PCT/SE2013/050497
§ 371 (c)(1),
(2) Date: Feb. 9, 2015

(87) PCT Pub. No.: WO2014/027942
PCT Pub. Date: Feb. 20, 2014

(65) Prior Publication Data
US 2015/0189610 A1 Jul. 2, 2015

Related U.S. Application Data

(60) Provisional application No. 61/682,577, filed on Aug. 13, 2012.

(51) Int. Cl.
*H04J 3/06* (2006.01)
*H04W 56/00* (2009.01)
(Continued)

(52) U.S. Cl.
CPC ........... *H04W 56/001* (2013.01); *G01S 5/021* (2013.01); *H04L 5/14* (2013.01); *H04W 24/08* (2013.01)

(58) Field of Classification Search
CPC ...... H04W 56/001; H04W 24/08; H04L 5/14; G01S 5/021
See application file for complete search history.

(56) References Cited

U.S. PATENT DOCUMENTS

2004/0087269 A1 * 5/2004 Edge .................... H04B 7/2678
455/11.1
2006/0267841 A1 * 11/2006 Lee ........................ G01S 5/0081
342/463

(Continued)

FOREIGN PATENT DOCUMENTS

CN 101485219 A 7/2009
WO 2008008685 A2 1/2008

*Primary Examiner* — Clemence Han
(74) *Attorney, Agent, or Firm* — Murphy, Bilak & Homiller, PLLC

(57) ABSTRACT

Conventional positioning methods based on measurements of wireless device transmissions may fail to account for adjustments to uplink transmit timing made by the wireless device. Problems caused by this failure may become even more severe when multiple timing advances are applied on different carriers, in multi-carrier operation where the carriers are non-co-located. One example method for handling timing measurements used for positioning, according to several of the techniques detailed herein, begins with obtaining (810) one or more timing measurement values for timing measurements performed on radio signals transmitted by a wireless device. Information related to one or more transmit timing adjustments applied to radio signal transmissions by a wireless device is also obtained (820). Finally, one or more of the timing measurement values are compensated (830) with a compensation value, based on the obtained information related to the one or more transmit timing adjustments applied by the wireless device.

42 Claims, 8 Drawing Sheets

(51) Int. Cl.
*G01S 5/02* (2010.01)
*H04L 5/14* (2006.01)
*H04W 24/08* (2009.01)

(56) References Cited

U.S. PATENT DOCUMENTS

| | | | |
|---|---|---|---|
| 2008/0045235 A1* | 2/2008 | Kennedy | G01S 5/0252 455/456.1 |
| 2009/0280836 A1* | 11/2009 | Chou | G01S 5/0221 455/456.5 |
| 2010/0130225 A1* | 5/2010 | Alles | H04W 64/00 455/456.1 |
| 2011/0243102 A1* | 10/2011 | Sebire | H04W 56/0045 370/336 |
| 2012/0014371 A1* | 1/2012 | Weng | H04J 3/0682 370/350 |
| 2012/0129550 A1* | 5/2012 | Hannan | G01S 5/0036 455/456.1 |
| 2013/0188620 A1* | 7/2013 | Dinan | H04W 56/0005 370/336 |
| 2014/0092812 A1* | 4/2014 | Jang | H04W 56/0045 370/328 |
| 2014/0219185 A1* | 8/2014 | Etemad | H04W 52/34 370/329 |
| 2014/0233524 A1* | 8/2014 | Jang | H04W 74/0833 370/329 |
| 2015/0146635 A1* | 5/2015 | Filipovich | H04W 74/0833 370/329 |

\* cited by examiner

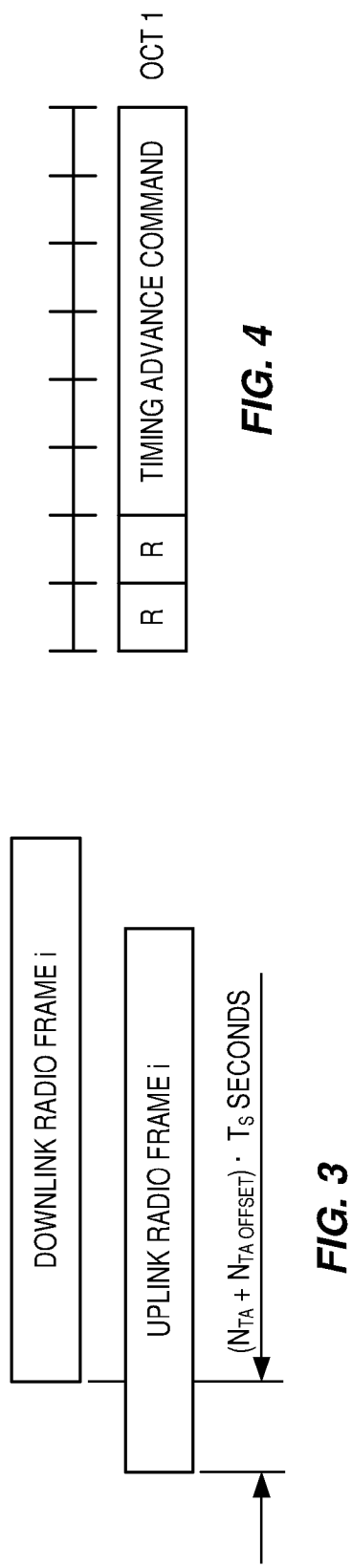
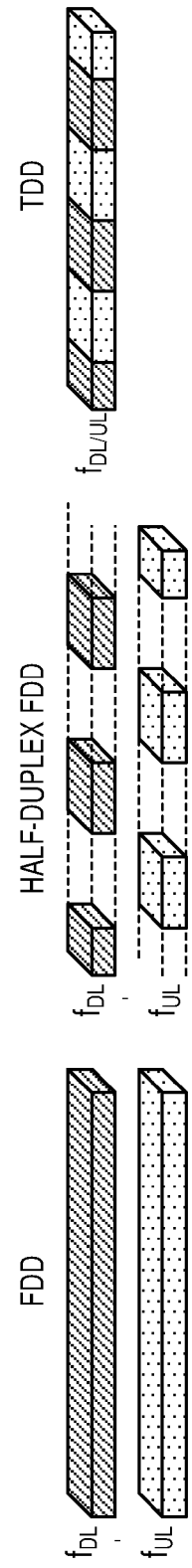
FIG. 3
FIG. 4
FIG. 5

ENHANCING POSITIONING WITH TRANSMIT-TIMING ADJUSTMENT INFORMATION

TECHNICAL FIELD

The present disclosure relates generally to wireless communication networks and in particular to networks and devices performing positioning of devices based on measurements of radio transmissions.

BACKGROUND

The development of technologies to determine the position of a mobile device has enabled application developers and wireless network operators to provide location-based and location-aware services. Examples of these are guiding systems, shopping assistance, friend finder, presence services, community and communication services and other information services that give the mobile user information about his or her surroundings or that use this information to enhance their services.

In addition to the commercial services facilitated by these technologies, location-based emergency services are also being deployed. The governments in several countries have put specific requirements on the network operators to be able to determine the position of an emergency call. For instance, governmental requirements in the United States specify that mobile networks must be able to determine the position of a certain percentage of all emergency calls and further include accuracy requirements. The requirements make no distinctions between indoor and outdoor environments.

In many environments, the position can be accurately estimated by using positioning methods based on Global Navigation Satellite Systems (GNSS), such as the well-known Global Positioning System (GPS). However, GPS-based positioning may often have unsatisfactory performance, especially in urban and/or indoor environments.

Complementary positioning methods may also be provided by a wireless network to augment GPS technology. In addition to mobile terminal-based GNSS (including GPS), the following methods are currently available or will be soon be included in the Long-Term Evolution (LTE) standards developed by the $3^{rd}$-Generation Partnership Project (3GPP):
  Cell ID (CID),
  E-CID, including network-based angle-of-arrival (AoA),
  Assisted-GNSS (A-GNSS), including Assisted-GPS (A-GPS), based on satellite signals,
  Observed Time Difference of Arrival (OTDOA),
  Uplink Time Difference of Arrival (UTDOA)—currently being standardized.

Several positioning techniques are based on time-difference-of-arrival (TDOA) or time-of-arrival (TOA) measurements. Examples include OTDOA, UTDOA, GNSS, and Assisted-GNSS (A-GNSS). A typical, though not the only, format for the positioning result with these techniques is an ellipsoid point with an uncertainty circle/ellipse/ellipsoid, which is the result of intersection of multiple hyperbolas/hyperbolic arcs (e.g., OTDOA or UTDOA) or circles/arcs (e.g., UTDOA, GNSS, or A-GNSS).

Several techniques, such as Adaptive Enhanced Cell Identity (AECID), may involve a mix of any of the methods above, and are thus regarded as "hybrid" positioning methods. With these methods, the position result can be almost any shape, but in many cases it is likely to be a polygon.

Cellular-based positioning methods (as opposed to satellite-based methods, for example) rely on knowledge of anchor nodes' locations, i.e., the fixed locations from which measured signals are transmitted (e.g., for OTDOA) or the fixed locations at which signals transmitted by mobile devices are measured (e.g., for UTDOA). These fixed locations may correspond, for example, to base station or beacon device locations for OTDOA, Location Measurement Unit (LMU) antenna locations for UTDOA, and base station locations for E-CID. The anchor nodes' locations may also be used to enhance AECID, hybrid positioning, etc.

Positioning Architecture

In 3GPP, location-based services are known as Location Services (LCS). Three key network elements in an LTE positioning architecture are the LCS Client, the LCS target and the LCS Server. The LCS Server is a physical or logical entity that manages positioning for a LCS target device by collecting measurements and other location information, assists the target device in measurements when necessary, and estimating the LCS target location. A LCS Client is a software-based and/or hardware entity that interacts with a LCS Server for the purpose of obtaining location information for one or more LCS targets, i.e., the entities being positioned. LCS Clients may reside in a network node, an external node (i.e., a network external to a cellular network), a Public Safety Access Point (PSAP), a user equipment (or "UE," in 3GPP terminology for an end-user wireless station), a radio base station (or "eNodeB," in LTE systems), etc. In some cases, the LCS Client may reside in the LCS target itself. An LCS Client (e.g., an external LCS Client) sends a request to LCS Server (e.g., a positioning node) to obtain location information. The LCS Server processes and services the received requests and sends the positioning result (sometimes including a velocity estimate) to the LCS Client.

In some cases, the position calculation is conducted by a positioning server, such as an Enhanced Serving Mobile Location Center (E-SMLC) or a Secure User-Plane Location (SUPL) Location Platform (SLP) in LTE. In other cases, the position calculation is carried out by the UE. The latter approach is known as the UE-based positioning mode, while the former approach includes both network-based positioning, i.e., position calculation in a network node based on measurements collected from network nodes such as LMUs or eNodeBs, and UE-assisted positioning, where the position calculation in the positioning network node is based on measurements received from UE.

LTE Positioning Protocol (LPP) is a positioning protocol for control plane signaling between a UE and an E-SMLC, which is used by the E-SMLC to provide assistance data to the UE and by the UE for reporting measurements to the E-SMLC. LPP has been designed in such a way that it can also be utilized outside the control plane domain such as in the user plane in the context of SUPL. LPP is currently used for downlink positioning.

LTE Positioning Protocol Annex (LPPa), sometimes referred to as LTE Positioning Protocol A, is a protocol between the eNodeB and the E-SMLC, and is specified only for control-plane positioning procedures, although it still can assist user-plane positioning by querying eNodeBs for information. For example, LPPa can be used to retrieve information such as positioning reference symbol (PRS) configuration in a cell for OTDOA positioning, or UE sounding reference signal (SRS) configuration for UTDOA positioning, and/or eNodeB measurements. LPPa may be used for downlink positioning and uplink positioning.

FIG. 1 illustrates the UTDOA architecture currently under discussion in 3GPP, including nodes found in the Radio Access Network (RAN) and the core network, as well as an external LCS Client. Although uplink (UL) measurements may in principle be performed by any radio network node, such as the illustrated LTE eNodeB 110, the UL positioning architecture also includes specific UL measurement units, known as Location Measurement Units (LMUs), which are logical and/or physical nodes that measure signals transmitted by a target UE, such as the UE 130 illustrated in FIG. 1. Several LMU deployment options are possible. For example, referring to FIG. 1, LMU 120a is integrated into eNodeB 110, while LMU 120b shares some equipment, e.g., at least antennas, with eNodeB 110. LMU 120c, on the other hand, is a standalone physical node comprising its own radio components and antenna(s).

While the UTDOA architecture is not finalized, there will likely be communication protocols established for communications between a LMU and positioning node, and there may be some enhancements to support UL positioning added to the existing LPPa or to similar protocols.

In particular, a new interface between the E-SMLC and LMU is being standardized for uplink positioning. This interface, known as SLm, is terminated between a positioning server, e.g., the E-SMLC 140 pictured in FIG. 1, and an LMU. It is used to transport messages according to the SLmAP protocol, a new protocol being specified for UL positioning, between the E-SMLC and the LMU. SLmAP can be used to provide assistance data to an LMU, as discussed in further detail below. This protocol may also be used by the LMU to report to the E-SMLC results of measurements on radio signals performed by the LMU. The SLmAP protocol was previously referred to as the LMUp protocol; thus it should be understood that references herein to SLmAP are referring to a developing protocol referred to as LMUp elsewhere, and vice versa.

In LTE, UTDOA measurements, known as UL relative time-of-arrival (RTOA) measurements, are performed on Sounding Reference Signals (SRS). To detect an SRS signal, an LMU 120 needs a number of SRS parameters to generate an SRS sequence that is correlated against the received signal. These parameters are not necessarily known to LMU 120. Thus, to allow the LMU to generate the SRS sequence and detect the SRS signals transmitted by a UE, SRS parameters must be provided in the assistance data transmitted by the positioning node to LMU; these assistance data would be provided via SLmAP. The specific contents of the assistance data to be provided to LMUs by a positioning node are currently being discussed. It has been proposed that the same parameters should be signaled from the eNodeB to a positioning node.

TABLE 1

| Parameter Category | Parameters |
| --- | --- |
| General | C-RNTI |
| | Serving eNB eCGI, PCI |
| | UL-EARFCN |
| | Cyclic prefix Config |
| | UL-Bandwidth |
| SRS | Bandwidth |
| | Sub-frame configuration |
| | Frequency domain position |
| | Cyclic shift |
| | Duration |
| | Transmission comb |
| | Configuration index |
| | MaxUpPts |

TABLE 1-continued

Measurements for UL positioning and UTDOA are performed on UL transmissions, which may include, for example, reference signal transmissions or data channel transmissions. UL RTOA is the currently standardized UTDOA timing measurement, and may be performed on Sounding Reference Signals (SRS). The results of the measurements are signaled by the measuring node (e.g., LMU) to the positioning node (e.g., E-SMLC), e.g., over SLmAP.

FIG. 2 illustrates the current architecture under discussion in 3GPP for downlink (DL) positioning, again including nodes found in the Radio Access Network (RAN) and the core network, as well as an external LCS Client. It will be appreciated that this architecture includes many of the same components found in the UL positioning architecture illustrated in FIG. 1. Two additional components shown in FIG. 2, however, are the Serving Gateway (S-GVV) and the Packet Data Network Gateway (PDN GW, or P-GW). These gateways terminate the UE's interfaces towards the E-UTRAN network and the Packet Data Network (PDN), respectively.

LPP is currently used for downlink positioning. An LPP message may also include an LPP extension packet data unit (EPDU); Open Mobile Alliance (OMA) LPP Extensions, defined as LPPe, take advantage of this possibility. Currently, LPP and LPPe are used mainly for downlink positioning, while LPPa may be used both for DL and UL positioning.

Positioning Results

A positioning result is a result of processing of obtained measurements, including Cell IDs, power levels, received radio signal strengths or quality, etc. The positioning result is often based on radio measurements (e.g., timing measurements such as timing advance and RTT, or power-based measurements such as received signal strength, or direction measurements such as angle-of-arrival measurements) received from measuring radio nodes (e.g., UE or eNodeB or LMU).

The positioning result may be exchanged among nodes in one of several pre-defined formats. The signaled positioning result is represented in a pre-defined format, e.g., corresponding to one of the seven Universal Geographical Area Description (GAD) shapes. Currently, a positioning result may be signaled between:

- an LCS target, e.g., a UE, and an LCS server, e.g., over LPP protocol;
- two positioning nodes, e.g., an E-SMLC or SLP, e.g., over a proprietary interface;
- a positioning server (such as an E-SMLC,) and other network nodes, e.g., a Mobility Management Entity (MME), a Mobile Switching Center (MSC), a Gateway Mobile Location Center (GMLC), an Operations and Maintenance (O&M) node, a Self-Organizing Network (SON) node, and/or a Minimization of Drive Tests (MDT) node;
- a positioning node and an LCS Client, e.g., between an E-SMLC and a Public Safety Access Point (PSAP), or between an SLP and an External LCS Client, or between an E-SMLC and a UE.

Note that in emergency positioning, the LCS Client may reside in a PSAP.

Uplink Positioning Measurements

As the name suggests, measurements for uplink positioning (e.g., UTDOA) are performed on uplink transmissions, which may comprise, e.g., one or more of physical signal or channel transmissions, e.g., reference signal transmissions, random access channel transmissions, Physical Uplink Control Channel (PUCCH) transmissions, or data channel transmissions. Some examples of reference signals transmitted in LTE UL are SRS and demodulation reference signals.

UL Relative Time of Arrival (RTOA) is a currently standardized UTDOA timing measurement. The measurement may be performed on Sounding Reference Signals (SRS), which may be configured for periodic transmissions, typically comprising multiple transmissions but may also be one transmission. SRS transmissions may be triggered by any of the two trigger types:

Trigger type 0: higher layer signaling from eNodeB,

Trigger type 1: via downlink control channel signaling (DCI formats 0/4/1A for FDD and TDD and DCI formats 2B/2C for TDD).

Other example uplink measurements are the uplink measurements specified in 3GPP TS 36.214. These measurements include measurements of received signal strength, received signal quality, angle-of-arrival (AoA), eNodeB receive-to-transmit (Rx-Tx) timing, relative time-of-arrival (RTOA), and other measurements performed by radio network nodes (e.g., eNodeB or LMU). Other known measurements are UL TDOA, UL TOA, UL propagation delay, etc.

Timing Measurements

In LTE, the following timing measurements are standardized in release 9:

UE Receive-Transmit (Rx-Tx) time difference, eNodeB Rx-Tx time difference,

Timing advance (TA),

Reference Signal Time Difference (RSTD),

UE GNSS Timing of Cell Frames for UE positioning,

E-UTRAN GNSS Timing of Cell Frames for UE positioning.

In the above list, the first, second, and third items are timing related measurements that are similar to round-trip-time (RTT) measurements used in earlier systems. These measurements are based on both downlink and uplink transmissions. In particular, for UE Rx-Tx, the UE measures the difference between the time of an uplink transmission and the time of the received downlink transmission that occurs after the UE uplink transmission. Similarly, for eNodeB Rx-Tx, the eNodeB measures the difference between the time of a downlink transmission and the time of the received uplink transmission that occurs after the eNodeB downlink transmission.

In LTE there are additional timing measurements that are implementation dependent and not explicitly standardized. One example is a one-way propagation delay measurement. This is measured by eNodeB for estimation of a timing advance value to be signaled to the UE. Also, as stated above the UL RTOA measurement is being standardized for UTDOA.

The definitions of the various timing measurements in LTE are given below, as taken from the most recent version of the 3GPP specification 3GPP TS 36. 214:

For UE Rx-Tx time difference:

| | |
|---|---|
| Definition | The UE Rx − Tx time difference is defined as $T_{UE\text{-}RX} - T_{UE\text{-}TX}$<br>Where:<br>$T_{UE\text{-}RX}$ is the UE received timing of downlink radio frame #i from the serving cell, defined by the first detected path in time.<br>$T_{UE\text{-}TX}$ is the UE transmit timing of uplink radio frame #i.<br>The reference point for the UE Rx − Tx time difference measurement shall be the UE antenna connector. |
| Applicable for | RRC_CONNECTED intra-frequency |

For eNodeB Rx-Tx time difference:

| | |
|---|---|
| Definition | The eNB Rx − Tx time difference is defined as $T_{eNB\text{-}RX} - T_{eNB\text{-}TX}$<br>Where:<br>$T_{eNB\text{-}RX}$ is the eNB received timing of uplink radio frame #i, defined by the first detected path in time. The reference point for $T_{eNB\text{-}RX}$ shall be the Rx antenna connector.<br>$T_{eNB\text{-}TX}$ is the eNB transmit timing of downlink radio frame #i.<br>The reference point for $T_{eNB\text{-}TX}$ shall be the Tx antenna connector. |

Timing advance measurement ($T_{ADV}$):

| | |
|---|---|
| Definition | Type1:<br>Timing advance ($T_{ADV}$) type 1 is defined as the time difference:<br>$T_{ADV}$ = (eNB Rx − Tx time difference) + (UE Rx − Tx time difference),<br>where the eNB Rx − Tx time difference corresponds to the same UE that reports the UE Rx − Tx time difference.<br>Type2:<br>Timing advance ($T_{ADV}$) type 2 is defined as the time difference<br>$T_{ADV}$ = (eNB Rx − Tx time difference),<br>where the eNB Rx − Tx time difference corresponds to a received uplink radio frame containing PRACH from the respective UE. |

Timing measurements may be used for positioning (e.g., with E-CID, AECID, pattern matching, hybrid positioning methods), network planning, SON, eICIC, in managing heterogeneous networks (e.g., for optimizing the cell ranges of different cell types), configuration of handover parameters, time coordinated scheduling, etc. Timing advance is also used to control the timing adjustment of UE UL transmissions as described later.

Multi-Carrier or Carrier Aggregation

To enhance peak rates within a technology, so-called multi-carrier or carrier aggregation solutions are known. Each carrier in multi-carrier or carrier aggregation system is generally termed as a component carrier, or sometimes referred to as a cell. In simple terms, the component carrier is an individual carrier in a multi-carrier system. The term carrier aggregation is also referred to with the terms (e.g., interchangeably called) "multi-carrier system", "multi-cell operation", "multi-carrier operation", "multi-carrier" transmission and/or reception. Carrier aggregation is used for transmission of signaling and data in the uplink and downlink directions. One of the component carriers is the primary component carrier (PCC) or simply primary carrier or even anchor carrier. The remaining ones are called secondary component carriers (SCCs) or simply secondary carriers or even supplementary carriers. Generally the primary or anchor component carrier carries the essential UE specific signaling. The primary component carrier exists in both uplink and downlink direction in carrier aggregation. The network may assign different primary carriers to different UEs operating in the same sector or cell.

With carrier aggregation, the UE has more than one serving cell in downlink and/or in the uplink: one primary serving cell and one or more secondary serving cells operating on the PCC and SCCs respectively. The serving cell is interchangeably called the primary cell (PCell) or primary serving cell (PSC). Similarly, the secondary serving cell is interchangeably called the secondary cell (SCell) or secondary serving cell (SSC). Regardless of the terminology, the PCell and SCell(s) enable the UE to receive and/or transmit data. More specifically the PCell and SCell exist in downlink and uplink for the reception and transmission of data by the UE. The remaining non-serving cells are called neighbor cells.

Component carriers belonging to the CA may belong to the same frequency band (intra-band carrier aggregation) or to different frequency bands (inter-band carrier aggregation) or any combination thereof (e.g., two component carriers in band A and one component carrier in band B). Furthermore, the component carriers in intra-band carrier aggregation may be adjacent or non-adjacent in the frequency domain (intra-band, non-adjacent carrier aggregation). A hybrid carrier aggregation comprising any two of intra-band adjacent, intra-band non-adjacent and inter-band aggregations is also possible. Using carrier aggregation between carriers of different technologies is also referred to as "multi-RAT carrier aggregation" or "multi-RAT-multi-carrier system" or simply "inter-RAT carrier aggregation". For example, carriers from WCDMA and LTE may be aggregated. Another example is the aggregation of carriers from LTE Frequency-Division Duplex (FDD) and LTE Time-Division Duplexing (TDD) modes, which may also be interchangeably called as multi-duplex carrier aggregation system. Yet another example is the aggregation of LTE and CDMA2000 carriers. For the sake of clarity, carrier aggregation within the same technology as described can be regarded as 'intra-RAT' or simply 'single RAT' carrier aggregation.

The component carriers in carrier aggregation may or may not be co-located in the same site or radio network node (e.g., a radio base station, relay, mobile relay, etc.). For instance, the component carriers may originate at different locations (e.g., from non-co-located base stations, or from base stations and a remote radio head (RRH), or at remote radio units (RRUs)). Well-known examples of combined carrier aggregation and multi-point communication techniques include the Distributed Antenna System (DAS), the Remote Radio Head (RRH), the Remote Radio Unit (RRU), and Coordinated Multipoint (CoMP) transmission. The techniques described herein also apply to multi-point carrier aggregation systems as well as to multi-point systems without carrier aggregation. The multi-carrier operation may also be used in conjunction with multi-antenna transmission. For example signals on each component carrier may be transmitted by the eNodeB to the UE over two or more antennas.

Uplink Transmit Timing Adjustment

In GSM systems, the mobile station (MS) sends its data three time slots after it receives the data from the base transceiver station (BTS). This approach works well as long as the distance between the MS and the BTS is small. However, increasing distances require consideration of propagation delay as well. To handle this issue, a Timing advance (TA) is conveyed by the network to the MS. A current value for the TA is sent to the MS within the layer-1 header of each Slow Associated Control Channel (SACCH) message. The BTS calculates the first TA for a given MS when it receives a Random Access Channel (RACH) from the MS, and reports the TA to the base station controller (BSC). The BSC/BTS pass the TA value to the MS during the Immediate Assignment procedure.

In UMTS Terrestrial Radio Access (UTRA) systems operating in Frequency-Division Duplexing (FDD) mode, the Timing Advance parameter is not used. Instead the network adjusts downlink timing to each UE, and thus implicitly adjusts the uplink timing, which is relative to the downlink timing.

More specifically, during a connection the UE may adjust the transmission time instant for a transmission on the Dedicated Physical Data Channel (DPDCH) and/or Dedicated Physical Control Channel (DPCCH). When the UE autonomously adjusts its DPDCH/DPCCH transmission time instant, it shall simultaneously adjust the transmission time instant for the High-Speed Dedicated Physical Control Channel (HS-DPCCH), the E-DCH Dedicated Physical Control Channel (E-DPCCH), E-DCH Dedicated Physical Data Channel (E-DPDCH) and secondary Dedicated Physical Control Channel (S-DPCCH) by the same amount, so that the relative timing between DPCCH/DPDCH and HS-DPCCH is kept constant and so that DPCCH/DPDCH and E-DPCCH/E-DPDCH and S-DPCCH remain time aligned. If the receive timing for any downlink DPCCH/DPDCH or F-DPCH in the current active set has drifted, so that the time between reception of the downlink DPCCH/DPDCH in question and transmission of uplink DPCCH/DPDCH lies outside the valid range, L1 informs higher layers, so that the network can be informed and so that downlink timing can be adjusted by the network. The maximum rate of uplink transmit time adjustment, and the valid range for the time between downlink DPCCH/DPDCH or F-DPCH reception and uplink DPCCH/DPDCH transmission in the UE are defined by system requirements.

In Time-Division Duplexing (TDD) mode, the UTRAN may adjust the UE transmission timing with timing advance. The initial value for timing advance (TAphys) is determined in the UTRAN by measurement of the timing of the Physical Random Access Channel (PRACH) or the E-DCH Random-Access Uplink Control Channel (E-RUCCH). The required timing advance is represented as an 8-bit number (0-255), referred to in the specifications as "UL Timing Advance"' or "TAul," the UL Timing Advance being the multiplier of 4 chips that is nearest to the required timing advance (i.e., TAphys=TAul×4 chips). When Timing Advance is used, the UTRAN continuously measures the timing of a transmission from the UE and sends the necessary timing advance value. On receipt of this value, the UE adjusts the timing of its transmissions accordingly, in steps of ±4 chips.

The transmission of TA values is done by means of higher layer messages. Upon receiving the TA command the UE adjusts its transmission timing according to the timing advance command at the frame number specified by higher layer signaling. The UE is signaled the TA value in advance of the specified frame activation time, to allow for local processing of the command and application of the TA adjustment on the specified frame. The Node-B is also signaled the TA value and radio frame number that the TA adjustment is expected to take place.

If TA is enabled by higher layers, after handover the UE shall transmit in the new cell with a timing advance TA adjusted by the relative timing difference Δt between the new and the old cell:

$$TA_{new} = TA_{old} 2\Delta t.$$

In LTE systems, timing advance is generally handled as illustrated in FIG. 3, which illustrates the timing relationship between uplink and downlink subframes in LTE. According to 3GPP TS 26.211, transmission of the uplink radio frame number i from the UE shall start $(N_{TA}+N_{TA\ offset}) \times T_s$ seconds before the start of the corresponding downlink radio frame at the UE, where $0 \leq N_{TA} \leq 20512$, $N_{TA\ offset}=0$ for frame structure type 1 (FDD and HD-FDD) and $N_{TA\ offset}$ 624 for frame structure type 2 (TDD). Note that not all slots in a radio frame may be transmitted. One example is TDD, where only a subset of the slots in a radio frame is transmitted.

When a UE wishes to establish a Radio Resource Control (RRC) connection with the eNodeB, it transmits a Random Access Preamble, and the eNodeB estimates the transmission timing of the terminal based on this. Then, the eNodeB transmits a Random Access Response, which consists of timing advance command, based on which the UE adjusts the terminal transmit timing. Timing advance commands may be sent later, as well, to maintain the UE uplink timing. The timing advance is initiated from E-UTRAN with a MAC message that implies an adjustment of the timing advance. The currently standardized Timing Advance Command MAC control element has a fixed size and consists of a single octet, as shown in FIG. 4. The first two bits, labeled "R" in FIG. 4, are reserved, and set to zero. The remaining 6 bits carry the Timing Advance Command. This field indicates the index value $T_A$ (0, 1, 2 ... 63) used to control the amount of timing adjustment that UE has to apply.

To maintain uplink timing alignment, the UE uses a configurable timer timeAlignmentTimer to control how long the UE is considered to be uplink time-aligned. When a Timing Advance Command MAC control element is received, the UE applies the Timing Advance Command and (re)starts timeAlignmentTimer. If the timeAlignmentTimer expires, the UE flushes all Hybrid Automatic Repeat Request (HARQ) buffers, notifies RRC to release Physical Uplink Control Channel (PUCCH) and Sounding Reference Signal (SRS) resources, and clears any configured downlink assignments and uplink grants. According to the current standard, the UE shall not perform any uplink transmission except the Random Access Preamble transmission when timeAlignmentTimer is not running.

In LTE Release 8 and up to Release 10, there is only a single timing advance (TA) value per UE and for all uplink links, so a given UE has the same TA for transmission on all uplink carriers/cells if the UE supports uplink carrier aggregation. However, different UEs in a cell may have different transmit timings, and different UEs with uplink carrier aggregation transmitting in uplink carriers may have different timings. As of Release 11 of the 3GPP specifications for LTE, a UE on different carriers may have different timings, due to multiple TAs, as described below.

In LTE Release 11, support for multiple TA values was introduced, whereby a given UE may have different TA values for different serving cells. This is to support UE operation in a scenario in which the UE has different round trip delay with respect to different non-co-located physical nodes. Therefore the UE needs to transmit using different TA values to these non-co-located physical nodes. The most relevant scenario for the use of multiple TA values is the one in which the UE performs uplink transmissions to multiple uplink reception points. Each uplink transmission is sent on a different UL serving cell. For example a multi-carrier capable UE may transmit signals over carrier f1 and carrier f2 to an eNB and to a remote radio head (RRH) respectively, where the eNodeB and RRH are located at different sites. A UE might also need different TA values for uplink transmissions to cells in different bands, especially when the difference between the frequencies of different UL carriers used by the UE in multi-carrier is very large, e.g., where f1 and f2 operate on 700 MHz and 3500 MHz respectively.

There can be up to 5 downlink serving cells and 5 uplink serving cells according to 3GPP procedures in release 11. More than one serving cell can be grouped into the same TA group. The TA group containing the PCell is typically called the primary TA group, or pTAG. The pTAG may also contain SCell(s). The TA group containing only SCell(s) is typically called a secondary TA group, or sTAG. There is always only one pTAG, but there can be more than one sTAG. The pTAG and sTAG are UE-specific. Typically, cells with similar characteristics are grouped in the same TA group, but this depends on network implementation. For example all co-located cells are typically configured in the same TA group. Similarly, if possible, all cells in the same band that are co-located are also grouped in the same TA group. Information related to the TA groups is signaled by the network to the UE.

Serving cells in the same TA group share the same TA value. The downlink timing of one of the serving cells in the TA group is used by the UE as the timing reference for deriving its uplink transmit timing for autonomous uplink timing adjustment. (Autonomous uplink timing adjustments are discussed in detail below.) In a pTAG, the UE always uses PCell as the timing reference cell, for deriving the uplink transmit timing of the cells in the pTAG. In an sTAG, the UE uses one of the activated SCells as the timing reference cell for deriving the uplink transmit timing of the cells in the sTAG. If the timing reference SCell is deactivated, then the UE may select another activated SCell in that sTAG as a timing reference cell for deriving its uplink transmit timing.

Specific TA requirements in LTE include:
Timing Advance adjustment delay—the UE shall adjust the timing of its uplink transmission timing at subframe n+6 for a timing advancement command received in sub-frame n.
Timing Advance adjustment accuracy—the UE shall adjust the timing of its transmissions with an accuracy better than or equal to ±4*Ts seconds, relative to the signaled timing advance value compared to the timing of preceding uplink transmission. The timing advance command is expressed in multiples of 16*TS and is relative to the current uplink timing.

Autonomous Uplink Timing Adjustment

In addition to the TA based adjustment of the UL transmit timing described above, in the existing standards there is also pre-defined requirement on the UE to autonomously adjust its uplink timing in response to drifts in the eNodeB transmit timing. More specifically, the UE is required to follow the change in the frame transmit timing of the serving cell and correspondingly adjust its transmit timing for each transmission. The UE typically uses some sort of reference or pilot signals to track the downlink timing of the serving cell, such as the common reference signal, synchronization signals, etc.

A serving cell timing may change due to different reasons, such as due to variations in radio conditions, imperfection in clocks, maintenance activities, a deliberate attempt by the network to change timing or to compensate timing when timing drift exceeds a certain level, etc. In addition, it is also required that the UE changes its timing (increase or decrease) at a certain maximum rate. In other words, the size and number of adjustment steps applied over certain time is limited. The limit is ensured by the virtue of pre-determined requirements, which the UE should follow when the conditions are met, e.g., when UE transmit timing accuracy becomes worse than a pre-defined threshold. This is to make sure that the UE does not change the timing too fast. This requirement stems from the fact that if the UE changes its timing in the order of several microseconds (e.g., 3-4 microseconds) from one subframe to the next, the base station receiver may not be able to cope with the received signals. This will result in degradation of demodulation of signals transmitted by the UE and may ultimately result in uplink throughput loss.

Half-Duplex Operation

The LTE specifications enable Frequency Division Duplex (FDD) and Time Division Duplex (TDD) operation modes. Additionally, half-duplex operation is also specified, which is essentially FDD operation mode but with transmission and receptions not occurring simultaneously, as in TDD. FIG. 5 illustrates the basic differences between these three modes of operation. There is also another special case of an FDD band called "downlink FDD band" (also referred to as a "downlink FDD-only band"). A well-known example is that of LTE Downlink FDD band (716-728 MHz), which is being standardized. It does not have an uplink part of the spectrum and therefore for uplink transmission the downlink FDD band is always used in carrier aggregation mode with another FDD or TDD band. For example, downlink FDD band 712-728 might be used with LTE FDD band 2. TA for uplink on another band used with a downlink-only band would typically be sent by the downlink-only band.

Half-duplex mode has advantages with some frequency arrangements where the duplex filter may be unreasonable, which would result in high cost and high power consumption. Since the carrier frequency number (EARFCN) is unique, by knowing the carrier frequency number it is typically possible to determine the frequency band, which is either FDD or TDD, although the same part of the spectrum may be shared by multiple radio access technologies (RATs). Note that FDD and TDD are sometimes considered to be different RATs. Even if the same part of the spectrum is used for both FDD and TDD, their corresponding band numbers and other band-specific parameters (e.g., EARFCN) are different. A good example is that of 3.5 GHz spectrum. For instance, LTE FDD band #22 and LTE TDD band span the same part of the spectrum i.e. 3.4-3.6 GHz. However, it may be more difficult to find difference between full-duplex FDD and half-duplex FDD (HD-FDD) without explicit information, since a given FDD band can be used as full FDD or half-duplex-FDD (HD-FDD). HD-FDD is similar to FDD, but the UE cannot transmit and receive at the same time. HD-FDD is enforced by the eNodeB scheduler. The UE reports its capability to inform network whether or not it supports a particular FDD band in half duplex mode.

With respect to positioning operations, it should be noted that duplex information is currently not known to the LMU or positioning node.

Timing Advance with HD-FDD

In HD-FDD mode, from the UE perspective the uplink and downlink do not overlap in time. For DL-UL switching time, the UE ignores the end of the downlink subframe. For UL-DL switching time, some additional timing advance offset can be applied to the uplink transmissions. This is shown in FIG. 6, which illustrates the subframe timing relationship in HD-FDD mode.

Positioning Measurements for Different Duplex Modes

In LTE, OTDOA and E-CID positioning measurements and their corresponding requirements are specified for both FDD and TDD. For TDD mode, the same RSTD measurement definition, the same methods and the same accuracy requirements shall apply as for FDD. An exception is that for TDD the intra-frequency and inter-frequency RSTD measurement requirements are applicable only for selected uplink-downlink sub-frame configurations. In the case half-duplex FDD, the measurement period or reporting delay for certain positioning measurements may have to be extended or the requirements may have to be made applicable only to certain half-duplex configurations (i.e., when a particular number of downlink and/or uplink sub-frames are available).

In view of the introduction of new operating modes and carrier aggregation schemes in wireless communications systems, improved techniques for positioning are needed.

SUMMARY

As discussed above, many positioning methods are based on measurements performed, at least in part, on transmissions made by a wireless device such as a UE. For various reasons, however, the wireless device may adjust its uplink transmit timing; some of these adjustments are controlled by its serving radio network node. Positioning nodes and any nodes performing measurements based on uplink signals may be not aware of the timing adjustments performed by the wireless device. This may negatively impact positioning, especially positioning using timing measurements. The problem becomes even more severe when multiple timing advances are applied on different carriers, in multi-carrier operation where the carriers are non-co-located, i.e., located at different sites or physical locations, such as where one carrier is transmitted by an base station and another is transmitted by a remote radio head. Several of the techniques and devices described below address these problems.

One example method for handling timing measurements used for positioning, according to several of the techniques detailed herein, is carried out in a first node in a wireless communications network, such as a measurement node or a positioning node. The example method begins with obtaining one or more timing measurement values for timing measurements performed on radio signals transmitted by a wireless device. Information related to one or more transmit timing adjustments applied to radio signal transmissions by a wireless device is also obtained. Finally, one or more of the timing measurement values are compensated with a compensation value, based on the obtained information related to the one or more transmit timing adjustments applied by the wireless device. In some embodiments, the compensating comprises applying a compensation value to one or more of the timing measurements, which compensation value is equal to an aggregated transmit timing adjustment.

In some embodiments, obtaining the one or more timing measurements comprises performing the one or more timing measurements, while the timing measurements may be received from another node, in some embodiments. In some embodiments, obtaining the information related to one or more transmit timing adjustments comprises receiving the information from a second node. In some of these embodiments, this information is received from a wireless device, which may be the wireless device that applied transmit timing adjustments to the measured signals. In other embodiments, the information related to the one or more transmit timing adjustments applied to transmissions by the wireless device comprises is received from a base station controlling the wireless device. As discussed above, other possibilities exist, including that the information is relayed through one or more nodes.

Another example method also begins with obtaining one or more timing measurement values for timing measurements performed on radio signals transmitted by a wireless device and obtaining information related to one or more transmit timing adjustments applied to radio signal transmissions by a wireless device. This example method further includes controlling a measurement procedure based on the obtained information. This method can be combined with the method summarized above, in some embodiments, such that both the compensating and controlling operations are performed.

In some embodiments, the controlling of the measurement procedure comprises one or more of: deciding whether to restart measurements, deciding whether to continue measurements, and discarding the obtained one or more timing measurements. In some of these embodiments, the controlling is based on a comparison between an aggregated timing adjustment applied by the wireless device and a threshold.

In other embodiments, the controlling comprises one or more of: configuring one or more uplink measurements based on the obtained information and adapting the measurement procedure, based on the obtained information. Configuring one or more uplink measurements may comprise suggesting a search window for uplink measurements, in some embodiments, based on the obtained information. Likewise, in some embodiments, configuring one or more uplink measurements may comprise grouping measurements at the measuring node, based on the obtained information.

Either the controlling or compensating discussed above, or both, may be based on determining whether the wireless device is time-aligned or synchronized during the measurement, based on the obtained information. In some embodiments, the timing measurements include any one or more of: a propagation delay measurement, a UTDOA measurement, an E-CID measurement, a UE Rx-Tx measurement, an eNB Rx-Tx measurement, an RTT measurement, a TOA measurement, and a TDOA measurement.

Some of these example methods further include one or more of: using a compensated measurement for position calculation; using a compensated measurement in a positioning-related database; differentiating a compensated measurement from a measurement without using a timing adjustment; and signaling the obtained information to the node performing the measurement or to a positioning node.

Still other embodiments further comprise reporting a capability for the first node to the second node, where the capability indicates that the first node is capable of compensating positioning measurements or positioning results, or both, based on information related to one or more transmit timing adjustments applied to transmissions by a wireless device. Correspondingly, some methods may further include receiving a capability report from a second node, the capability indicating that the second node is capable of compensating positioning measurements or positioning results, or both, based on information related to one or more transmit timing adjustments applied to transmissions by a wireless device. In some of these embodiments, compensating one or more positioning measurements performed on transmissions by the wireless device or positioning results for the wireless device, or adjusting the performing of measurements on transmissions by the wireless device, or both, based on the obtained information, is further based on the received capability report. In others of these embodiments, the information related to one or more transmit timing adjustments applied to transmissions by the wireless device is selectively forwarded, based on the received capability report.

Various methods corresponding to the embodiments summarized above are illustrated in the attached drawings and described in detail in the following discussion. Corresponding apparatus adapted to carry out one or more of these methods, and variants thereof, are also detailed. Of course, the present invention is not limited to the above-summarized methods, apparatus, features, and advantages. Indeed, those skilled in the art will recognize additional features and advantages upon reading the following detailed description, and upon viewing the accompanying drawings.

BRIEF DESCRIPTION OF THE DRAWINGS

FIG. 3 illustrates a timing relationship between uplink and downlink subframes in an LTE network.

FIG. 4 shows the format of an LTE Timing Advance MAC control element.

FIG. 5 contrasts half-duplex FDD operation with FDD and TDD operations.

DETAILED DESCRIPTION

Figure 1:
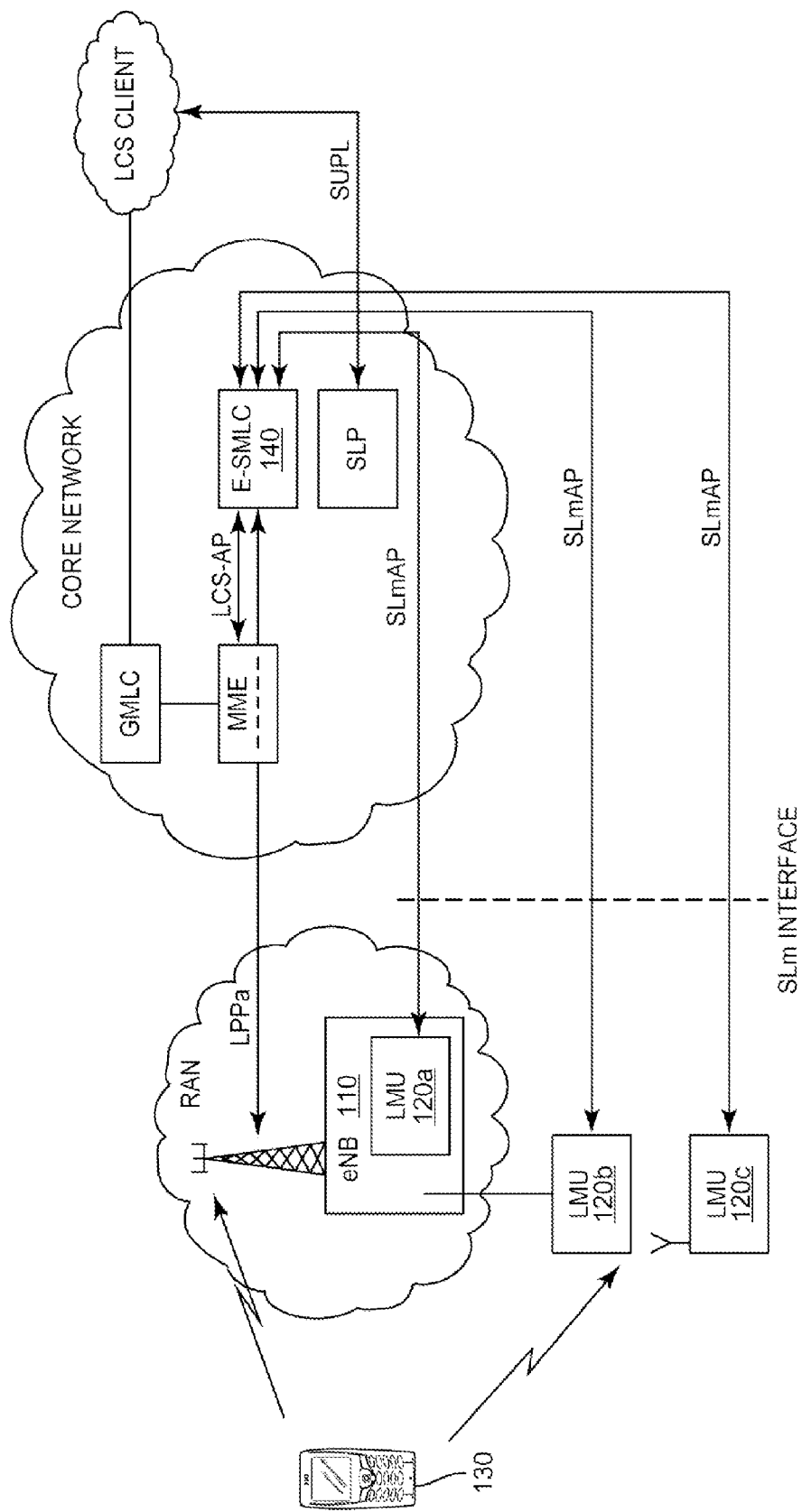
FIG. 1 illustrates several nodes in an example network configured according to the LTE positioning architecture for uplink positioning.

While terminology from 3GPP LTE is used in this disclosure to exemplify the invention, this should not be seen as limiting the scope of the invention to LTE systems or systems using the LTE Radio Access Technology (RAT). Other wireless systems, including those based on WCDMA, WiMAX, UMB and GSM, may also benefit from exploiting the ideas covered within this disclosure. Furthermore, the inventive techniques disclosed herein are not limited to single-RAT systems, but may also be applied in the multi-RAT context. Some other RAT examples are LTE-Advanced, UMTS, HSPA, GSM, cdma2000, WiMAX, and WiFi.

Still further, the techniques and apparatus described herein may be considered as standalone embodiments or may be used in any combination with each other, unless their descriptions herein clearly indicate otherwise.

The terms "wireless device" and "UE" are used interchangeably in the description that follows. A UE may comprise any device equipped with a radio interface and capable of at least generating and transmitting a radio signal to a radio network node. Note that some radio network nodes, e.g., a femto base station, or "home base station," and LMUs, may be equipped with a UE-like interface, and in some cases may need to be positioned in the same manner as UEs are positioned. Examples of UEs that are to be understood in a general sense are wireless PDAs, wireless-equipped laptop computers, mobile telephones, wireless sensors, fixed relay nodes, mobile relay nodes, and any radio network node equipped with a UE-like interface (e.g., small RBS, eNodeB, femto BS).

A "radio node" is characterized by its ability to transmit and/or receive radio signals, and comprises at least a transmitting or receiving antenna. A radio node may be a UE or a radio network node. Some examples of radio nodes are a radio base station (e.g., eNodeB in LTE or NodeB in UTRAN), a relay, a mobile relay, a remote radio unit (RRU), a remote radio head (RRH), a wireless sensor, a beacon device, a measurement unit capable of transmitting downlink signals (e.g., LMUs), a user terminal, a wireless PDA, a mobile telephone, a smartphone, a wireless-equipped laptop, etc.

A "radio network node" is a radio node in a radio communications network and is typically characterized by having its own network address. For example, a mobile device in a cellular network may have no network address, but a wireless device involved in an ad hoc network is likely to have a network address. A radio node may be capable of operating or receiving radio signals or transmitting radio signals in one or more frequencies, and may operate in single-RAT, multi-RAT or multi-standard mode (for example, a dual-mode user equipment may operate with any one or combination of WFi and LTE or HSPA and LTE/LTE-A). A radio network node, including eNodeB, RRH, RRU, LMU, or transmitting-only/receiving-only nodes, may or may not create own cell. It may also share a cell with another radio node which creates own cell. More than one cell may be associated with one radio node. Further, one or more serving cells (in DL and/or UL) may be configured for a UE, e.g., in a carrier aggregation system where a UE may have one Primary Cell (PCell) and one or more Secondary Cells (SCells). A cell may also be a virtual cell, e.g., characterized by a cell ID but not providing a full cell-like service, associated with a transmit node.

A "network node" may be a radio network node or a core network node. Some non-limiting examples of a network node are an eNodeB, a Radio Network Controller (RNC), a positioning node, an MME, a PSAP, a SON node, an MDT node, and an O&M node. A "coordinating node," as described below may be but is not necessarily a network node.

A "positioning node" as described in several embodiments herein is a node that has positioning functionality. For example, for LTE it may be understood as a positioning platform in the user plane (e.g., SLP in LTE) or a positioning node in the control plane (e.g., E-SMLC in LTE). An SLP may also consist of a SUPL Location Center (SLC) and a SUPL Positioning Center (SPC), where the SPC may also have a proprietary interface with E-SMLC. Positioning functionality may also be split among two or more nodes. For example, there may be a gateway node between LMUs and E-SMLC, where the gateway node may be a radio base station or another network node; in this case, the term "positioning node" may relate to E-SMLC and the gateway node. In a testing environment, a positioning node may be simulated or emulated by test equipment.

A "measuring node" is a radio node performing positioning measurements, and may be a wireless device or a radio network node (e.g., an LMU or eNodeB). Downlink measurements are typically measurements performed by a wireless device on at least signals/channels transmitted by one radio network node. Uplink measurements are typically measurements performed by a radio network node on at least signals/channels transmitted by one or more wireless devices. There are also measurements that include both uplink and downlink measurement components, e.g., Rx-Tx or RTT. In some uplink measurements, typically, the measurement is performed by a radio network node on signals/channels transmitted by wireless device as well as by the network node itself. Some examples of uplink positioning measurements, or radio measurements that may be used for positioning, are timing measurements (e.g., TDOA, TOA, timing advance Type 1 and timing advance Type 2, RTT measured by a radio network node, UL RTOA defined for UTDOA, UL propagation delay, etc.), angle measurements (e.g., AoA), received signal strength and received signal quality measurements. Some of these measurements are defined in 3GPP TS 36.214, the latest version of which may be found at www.3gpp.org. Uplink measurements may also include measurements that have at least one uplink measurement component, e.g., the uplink measurement component of a two-directional measurement.

The term "coordinating node" as used herein is a network and/or node that coordinates radio resources among one or more radio nodes. Examples of a coordinating node are a network monitoring and configuration node, an OSS node, an O&M node, an MDT node, a SON node, a positioning node, an MME, a gateway node such as Packet Data Network Gateway (P-GVV) or Serving Gateway (S-GVV) network node or femto gateway node, a macro node coordinating smaller radio nodes associated with it, an eNodeB coordinating resources with other eNodeBs, etc.

The signaling described below in connection with various embodiments of the invention is either via direct links or logical links (e.g., via higher layer protocols and/or via one or more network and/or radio nodes). For example, signaling from a coordinating node may pass through another network node, e.g., a radio network node.

The term "subframe" as used in the description herein (typically related to LTE) is an example resource in the time domain, and in general it may be any pre-defined time instance or time period. The term "measurement" as used herein may refer to a measurement process or to the result of that measurement process. In some cases, the term "measurement value" is used to refer to the result of a measurement process. Similarly, the term "compensation" may refer to a compensating process or to a value used in compensating some other value, i.e., a "compensation value."

Several of the technical embodiments described herein are described in the context of uplink (UL) positioning, i.e., positioning techniques based on measurements of uplink transmissions. The most typical example of such a positioning method is UTDOA, but the techniques described herein may be applied to other UL positioning approaches as well. UL measurements may be timing measurements (e.g., time of arrival, UE Rx-Tx, eNodeB Rx-Tx, RTT, propagation delay, time-difference of arrival) or power-based measurements (e.g., received signal strength or received signal quality).

The embodiments described herein are not limited to LTE, but may apply to any Radio Access Network (RAN), singleor multi-RAT. Some other RAT examples are LTE TDD, LTE-Advanced, UMTS, HSPA, GSM, cdma2000, WiMAX, and WiFi.

The term multi-antenna system herein generally refers to a system capable of using more than one transmit antenna and/or more than one receive antenna. However, the adapted configuration may comprise in some examples only one transmitter and one receiver, based on a certain adaptation criteria. Such a system may also use any advanced antenna technology, e.g., any MIMO scheme, any transmit diversity scheme, any receive diversity scheme, beam-forming, vertical beam-forming (e.g., by adjusting antenna elements' tilts), etc.

The techniques and devices described herein apply to multi-point antenna deployments (e.g. CoMP, DAS, heterogeneous deployments with RRUs, RRH, multi-point transmission and/or reception systems), which generally refers to a system using more than transmit antenna and/or more than one receive antenna, where at least two transmit antennas and/or at least two receive antennas associated with the same node are non-collocated. Multi-antenna techniques may be used in systems with multi-point antenna deployments. The techniques described herein can also apply to carrier aggregation systems and multi-point carrier aggregation systems.

While several of the techniques described below are described in the context of uplink measurements, it should be appreciated that embodiments of the techniques and devices described herein are also applicable to downlink measurements, e.g., UE Rx-Tx time difference measurements. In general, the embodiments are applicable to any type of timing measurement that is performed by a measuring node at least partly based on signals transmitted by a wireless device. More particularly, the signals transmitted by a wireless device can be subjected to timing adjustments, e.g., by the virtue of a timing advance command.

At least the following problems may be envisioned with current positioning solutions and techniques:
  Timing advance was not used in UTRA FDD, for which UTDOA was standardized. UTDOA was not standardized for TDD, for which timing advance did exist.
  UTDOA uses a measurement on UE-transmitted signals; the measurement is called received time-of-arrival (RTAO) of signals. In LTE UTDOA, the use of timing advance applied by the UE to transmit timing will affect the accuracy of RTOA measurements.
  In LTE multicarrier systems, multiple timing advances (TAs) can be used. For example one TA is applicable to serving cells in the same TA group (TAG). There can be multiple TAGs. The use of multiple TAs and TAGs in multicarrier system will affect the accuracy of the uplink positioning measurements in general and UTDOA measurements in particular. Multiple TAs, when used, need to be accounted for in positioning.
  In LTE multicarrier, the UE will also autonomously apply UL transmit timing adjustments separately on cells that belong to different TAGs. The independent uplink autonomous timing adjustments will also affect the uplink positioning measurements involving multiple cells in multicarrier system.
  Conventional positioning methods use one or more timing measurements performed by the UE and/or serving node (e.g., eNodeB) and/or non-serving radio node (e.g., eNodeB, LMU) to estimate a position of the user. The timing adjustment applied by the UE may affect the accuracy of the determined UE position.
  In short, the UE may adjust its uplink transmit timing; some of these adjustments are controlled by its serving radio network node. Positioning nodes and any nodes performing measurements based on UL signals may be not aware of the timing adjustments performed by the UE. This may negatively impact positioning, especially positioning using timing measurements. The problem becomes even more severe when multiple TAs are applied on different carriers, in multi-carrier operation where the carriers are non-co-located (i.e., located at different sites or physical locations, such as one carrier transmitted by an eNB and another transmitted by a RRH).

Several of the techniques and devices described below address these problems. These techniques and devices include, but are not limited to:
  Methods in a wireless device or a network node (e.g., positioning node, eNodeB or measuring network node), several of which methods comprise:
    Obtaining information related to transmit timing adjustment applied by the wireless device on its transmitted signal (e.g., TA information from TA command or aggregated TA applied over a time period);
    In some embodiments, obtaining (e.g., measuring or receiving from another node) at least one timing measurement performed by a measuring node on at least one radio signal transmitted by the said wireless device;
    Performing at least one action related to the timing measurement performed on at least one signal transmitted by a wireless device, e.g.,
      stopping or triggering a stopping of the measurement, and/or
      forwarding the obtained information to a measuring node (e.g., to an LMU), which uses it for applying a compensation to a timing measurement performed by the said measuring node,
      applying, based on the obtained information, a compensation to the said timing measurement, which compensation is applied to compensate the timing adjustment applied by the said wireless device (the compensation may also account for, e.g., does not include, a timing advance offset associated with downlink and uplink subframe timing relation such as for the offset with TDD or HD-FDD)), and/or
      using the compensated timing measurement for one or more radio operations, e.g., reporting it to another node (e.g. positioning node), using it for determining position of wireless device, meeting a pre-determined requirement corresponding to the compensated timing measurement etc.
  Methods in a wireless device or a network node (e.g., positioning node or measuring node or eNodeB collecting and reporting measurements to the positioning node, etc.) where some of these methods comprise:
    Reporting a capability to another node (e.g. positioning node), which capability indicates that it is capable of applying a compensation to at least one timing measurement performed on at least one radio signal transmitted by a wireless device, which compensation is used to account for the transmit timing adjustment applied by the wireless device on its transmitted signal.

It will be appreciated that two or more of the methods summarized above and described in detail below can be combined. Other embodiments of the present techniques, also described in detail below, include radio nodes, network nodes, and other devices configured to carry out one or several of the methods summarized above.

In the discussion that follows, several techniques for assisting positioning measurements are described, as might be implemented in any of several nodes in a wireless communication system. For purposes of discussion, three categories of these techniques, labeled "Solution Category 1", "Solution Category 2", and "Solution Category 3", are described below. However, it should be appreciated that these categories of techniques are closely related, and any of the specific embodiments described in any of these categories may be combined with each other, in various embodiments. Likewise, variations of specific embodiments described below may be applied in similar ways to other embodiments.

Solution Category 1—Obtaining and Using Information Related to Transmit Timing Adjustments According to several embodiments of the techniques described in this section, a first node obtains information related to transmit timing adjustment of a wireless device, where the information related to transmit timing adjustment may comprise, e.g., any one or more of:

data describing the amount of timing adjustment, where any timing adjustment may be positive, negative or even zero (note that this applies throughout the present disclosure);

an amount of aggregated timing adjustment applied by the UE

The information may contain additional information such as any one or more of: a time period over which the said adjustment is applied, a number of time adjustments, starting and terminating reference times between which the said adjustment is applied, etc. The information may also include whether the timing adjustment is applied due to TA command, UE autonomous adjustment, due to the combination of TA and UE autonomous adjustment, etc. Examples of starting reference times are the start of a call session time, the time when UE initiated the call, the time when UE transmit timing was aligned with an uplink frame timing, etc. Examples of ending reference timings are a time when an UL positioning measurement has started or will start within certain time period, a time instance when a request is received from another node to provide UE transmit timing adjustment information, etc.

The aggregated timing adjustment applied by the UE may be calculated/accumulated by the UE, serving eNodeB, measuring node (e.g., LMU or another eNodeB) or positioning node; the aggregated timing adjustment may be calculated once or maintained and updated dynamically; the accumulation may be associated with a new timer and/or a value (describing the current amount of the aggregated timing adjustment); the accumulation may be controlled (e.g., triggered/restarted) by the accumulating node or by another node (e.g., by signaling to the accumulating node an explicit or implicit indication of an action with respect to aggregated timing adjustment; example: update upon a new TA command and restart the measurement).

The aggregated timing adjustment may exclude a timing advance offset (e.g., associated with downlink and uplink subframe timing relation, such as for the offset with TDD or HD-FDD)

an indication of the fact of at least one timing adjustment for at least one wireless device;

the information comprised in a TA command;

a capability related to transmit timing adjustment;

an indication of uplink time misalignment for all or some of the carriers (the indication may also comprise indication of aligned and/or misaligned carriers);

time elapsed from the last TA command sent to the UE or the last time when it is known that the UE is time aligned (may be used, e.g., to keep track, e.g., at a measuring node or positioning node when the UE may become uplink time misaligned);

an uncertainty or quality of transmit timing adjustment;

a type of timing adjustment applied by the UE

Examples of type of adjustment are: timing adjustment applied in response to received TA command from the network, autonomous timing adjustment applied by the UE when UE transmit timing accuracy becomes worse than a threshold, combined timing adjustment including two or more types of adjustment or all types of adjustment, etc.

whether timing adjustment is applied based on single TA or multiple TA;

information about TAGs;

an amount of change in the transmit timing of the serving node of the wireless device This change in timing implicitly indicates the amount of autonomous adjustment to be applied by the UE, a timing advance offset (e.g., for TDD, HD-FDD, DL FDD band or UE-autonomous timing advance offset).

Note that the first node may comprise a positioning node or a measuring node. The measuring node may be the serving node of the wireless device, the wireless device itself, or a standalone node (e.g., LMU or non-serving eNodeB) measuring signals transmitted by wireless device.

The information related to transmit timing adjustment may be obtained in many ways, e.g., one or any combination of:

Acquired from a local database or may be pre-configured or determined by a pre-defined rule (e.g., a timer used for determining when a UE may become UL time-misaligned);

Autonomously, e.g., based on historical data, collected measurements, etc.

In one example, the amount of timing adjustment may also be estimated based on the difference of two consecutively received Rx-Tx timing measurements or other information used for determining the search window configured for the measurements Via cross-layer communication (e.g., when the first and the second node may be comprised in the same physical node such as when LMU and eNodeB are integrated);

Signaled via a proprietary interface (e.g., between LMUs and eNodeBs when LMUs integrated into eNodeB or sharing some equipment); and By signaling (e.g., via LPP, LPPe, LPPa, LMUp or SLmAP, X2, interface between two positioning nodes or between E-SMLC and SLP) from a second node (e.g., wireless device, eNodeB, another positioning node) where the signaling may also be via a third node (e.g., via a wireless device or eNodeB or positioning node), transparent or not to the third node In the transparent case, the third node does not modify the entire or at least a part of the message when sending/relaying/forwarding it to the first node; the third node may not even read the contents of the sent/relayed/forwarded part it received from the second node. In the non-transparent case, the third node may create a new message, may change (add, extract certain parts, modify) or rearrange the contents or its format, or at least may read the message received from the notifying node.

In some embodiments, the third node may also selectively send to the first node the information related to timing adjustment, e.g., it may send this information with a periodicity longer than it receives the information from the second node. There may also be a pre-defined rule specifying that the third node should provide the information related to transmit timing adjustment within a certain time; the time may be related to a TA requirement. In one example, the signaling may comprise a TA command. In another example, the signaling may comprise a signal configuration information updated message. In yet another example, the signaling is an LPPa or LPP or LPPe message The signaling may comprise an explicit notification, or an implicit notification, or a combination of both.

Figure 7:
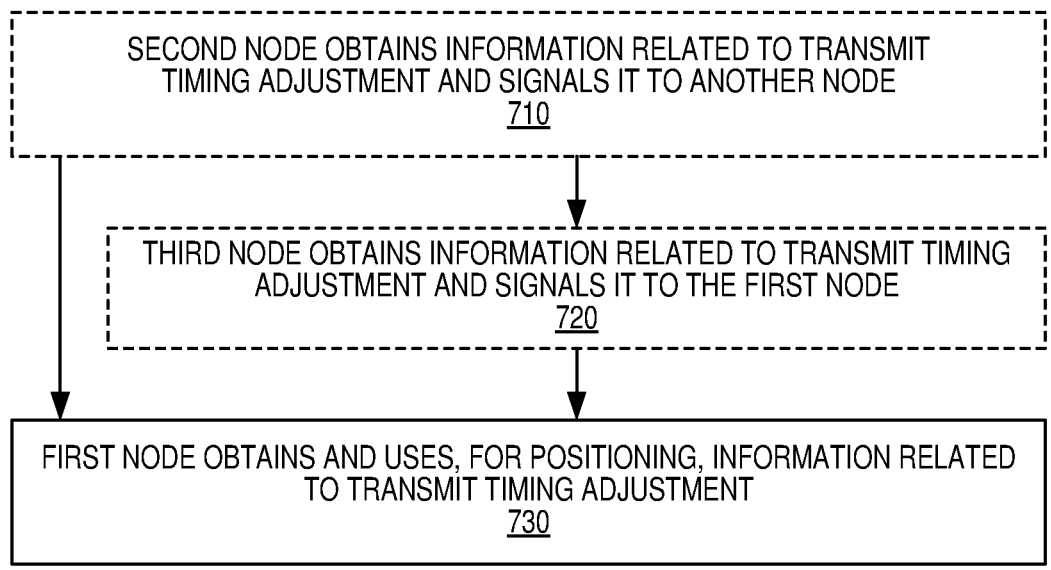
FIG. 7 illustrates an example communication flow for information related to transmit timing adjustment.

The communication of the information related to transmit timing adjustment may be as illustrated in FIG. 7. As can be seen in the figure, there are several ways that the first node can obtain, for use in positioning, information related to transmit timing adjustment, as shown at block 730. In the illustrated example, either the second node or the third node (or both) may obtain information related to transmit timing adjustment using any of the embodiments described herein for the first node. This is shown at blocks 710 and 720. The second or third node may also obtain this information partly or fully internally.

For example if the second node is the serving eNB of the wireless device, then the second node sends a TA command to the wireless device for uplink timing adjustment. The wireless device applies the autonomous timing adjustment when there is drift in the transmit timing of the serving node. The serving node (e.g. eNB), by estimating its own transmit timing drift, can thereby also implicitly determine the autonomous timing adjustment to be applied by the wireless device. Further, the second and/or the third nodes may also use themselves this information. Furthermore, the information related to transmit timing adjustment may or may not be exactly the same in the first, second, and the third nodes. For instance, the first node may receive a selected amount of information from the second node, which may also be in a different format.

The information related to transmit timing adjustment may be obtained by the first node, which is a positioning node or a measuring node, once or several times, in various embodiments. In some cases the information may be obtained periodically, e.g., according to a repetitive timer, or it may be obtained on an aperiodic basis. In some embodiments, it may be obtained in response to a request from the first node, whether implicit or explicit. In other embodiments, the information may be provided pro-actively upon a request (implicit or explicit) or provided pro-actively by a second or third node.

Likewise, a node that has the UE transmit timing adjustment information (e.g., the second and/or the third node, etc.) may provide the information related to transmit timing adjustment to the first node or to the third node, e.g.:

periodically, aperiodically, or once, upon a received request (implicit or explicit), e.g., upon an explicit request received from a positioning node or from a measuring node, upon an indication that a measuring node is performing or may/will start performing a positioning measurement, etc.

upon receiving this information from another node (e.g., when the third node is receiving this information from the first node), upon the occurrence of one or one triggering events, such as when a measuring node is performing or may/will perform a positioning measurement within a certain time, when a positioning request or an indication that a positioning measurement session is starting is implicitly or explicitly received from a positioning node, when aggregated TA exceeds a threshold, when the measurement period expires (e.g., aggregated TA may be provided in the end of a measuring period) or the measurement is being finalized due to a certain event, when a handover occurs, when an event which may stop positioning measurement occurs (e.g., the measured signals are not transmitted any more or the signal configuration has changed the information related to transmit TA may be provided in a signal configuration information updated message), when signal information for performing positioning measurement is being requested, when a particular type of a positioning measurement is being performed or will be performed within certain time period (examples of positioning measurements are one propagation delay, eNB UE Rx-Tx time difference, etc.), when the positioning measurement is performed by a particular node, e.g., by LMU, when a UE is configured with at least one SCell in multi-carrier operation, when a configured SCell is de-configured, when an activation state of SCell changes, e.g., from activated SCell to deactivated SCell, when a TA group is modified, e.g., downlink timing reference cell is changed within a TAG, PCell or SCell in TAG are changed, etc., when the number of TAGs are changed, e.g., from 1 TAG to 2 TAG or vice-versa, upon the satisfaction of one or more triggering conditions, example triggering conditions including:

when the magnitude of the amount of the transmit timing adjustment is above a threshold, when the magnitude of an aggregated amount of transmit timing adjustment is above a threshold, when the magnitude of aggregated amount of transmit timing adjustment over a certain duration is above a threshold. The duration can be a fixed amount of time. It can also be a time bounded by certain starting and ending reference times, e.g., between start of a session and start of a positioning measurement.

when the magnitude of the amount of the transmit timing adjustment deviates from a reference time by certain margin, e.g., when it deviates from normal uplink frame timing by 1 microsecond or more, when UE speed is above a threshold, when UE movement direction is such that TA is impacted, when there is any drift in the transmit timing of a radio node serving the UE, when the magnitude of the drift in the transmit timing of a radio node serving the UE increases above a threshold. This will trigger an adjustment of UE transmit timing, etc.

whenever a new TA command is sent by the serving node to the UE, whenever the magnitude of a new TA command sent by the serving node to the UE is above a threshold.

A node (e.g., any one or more of the first, second or third nodes illustrated in FIG. 7) obtaining the information related to transmit timing adjustment may use this information for one or more actions. These actions, in general, may comprise applying a compensation value or values to positioning measurements, applying a compensation value to a positioning result, and/or taking an appropriate action as described below. The action and the node that takes the action may depend upon the type of timing measurement and/or type of positioning method, etc. More specific examples of actions are:

Calculating a positioning result. The positioning result is based on positioning measurements. The positioning result is typically calculated by a positioning node or wireless device, and sometimes by a radio network node. A compensation value to account for timing adjustment may be applied directly to the positioning results. This may be done by the positioning node. It may also be done by a wireless device in the case of a UE-based positioning method. Capability information related to the ability of applying the compensation or a pre-defined rule may also be used to ensure that the compensation is obtained once by one of the involved nodes.

Compensating a timing measurement to account for the amount of transmit timing adjustment. The compensation may be applied by the measuring node during the measurement, at the start of the measurement, at the end of the measurement or after the measurement is complete. In another example, the compensation may be applied to the timing measurement results obtained by a positioning node before the position is derived from the timing measurements. The node that applies compensation may be pre-determined or it may be based on capability knowledge or may be based on an indication sent by another node e.g. by positioning node. For example, assume the first node (e.g., a measuring node) performs a timing measurement, which uses at least the uplink signals transmitted by the UE. The measurement results is +T0 seconds. The obtained information related to the timing adjustment indicate that the UE's aggregated transmit timing is adjusted by +T1 seconds with respect to a reference time, e.g., with respect to uplink frame timing. The measuring node therefore derives the new measurement result (T0') by using the expression T0'=T0+(−T1). The compensated results (T0') are used for determining the position of the user. The amount of transmit timing adjustment may be calculated with respect to:

one of the previously known timings and/or previously known timing adjustments (e.g., the last or the N-th last) or, a known timing and/or known timing adjustment associated with a certain event or time instance (e.g., transmission configuration applied, transmission configuration reported to a positioning node, the timing measurement (re)started, the beginning of a certain radio frame or subframe e.g. SFN0).

using at least one of the positioning result or timing measurement compensated for the transmit timing adjustment in a positioning-related database, e.g., for any one or more of:

obtaining a positioning result with AECID positioning method, pattern matching positioning, RF fingerprinting positioning, or positioning with E-CID measurements, for populating the database with a new fingerprint composed of the compensated timing measurement and/or the compensated positioning result.

applying compensation to account for the amount of transmit timing adjustment according to a pre-defined rule in that the compensation is applied to the timing measurement by a node which determines the location of the wireless device using the timing measurement, e.g., a wireless device applies compensation, in the case of UE-based positioning, a positioning node applies compensation, in the case that a positioning node determines UE location.

differentiating among measurements which may or may not be impacted by the transmit timing adjustment, e.g., based on the information related to timing adjustment, the amount of timing adjustment, and/or on the capability information The differentiating may also comprise selecting a different algorithm for processing the UL measurement, depending on the differentiating result.

The differentiating may also comprise determining whether the measurement was performed while the UE was time-aligned or not (e.g., a positioning node may use only uplink measurements reported by LMUs performed when the UE was uplink time aligned. LMUs may or may not be aware of transmit timing adjustment. In one example, a positioning node may determine time alignment/misalignment using a timer.

configuring uplink measurements (e.g., configuring a search window for sampling uplink measurements, configuring a measurement grouping for multiple UEs)

In one example, a positioning node obtains the information related to transmit timing adjustment and suggests (via signaling) a search window for an LMU performing uplink positioning measurements; the search window may be adjusted and provided more than once (e.g., if transmit timing adjustment happens multiple times), e.g., in SRS update message via SLmAP protocol; the search window size may be larger when the amount of transmit timing adjustment is larger The amount of timing adjustment may also be estimated based on the difference between two consecutively received Rx-Tx timing measurements used for determining the search window.

In another example, a larger search window may be used when transmit timing adjustment is above a threshold since the UE may in this case move faster or there may be a large uncertainty in TA.

In yet another example, a measuring node (e.g., LMU) may perform grouping of measurements for the same or different UEs, based on the information related to transmit timing adjustment.

restarting a measurement in case the aggregated timing adjustment is above a threshold, discarding a timing measurement (i.e. not using for positioning) in case the aggregated timing adjustment is above a threshold, starting or continuing a timing measurement provided the aggregated timing adjustment is below a threshold, stopping uplink measurements (e.g., when the information about transmit timing adjustment comprise the information that UE is not UL time aligned, otherwise if the measuring node will continue sampling while the UE stopped transmitting SRS due to misalignment, the measurement may have a large error or in the worst case may be not even used for positioning)

In one example, when eNodeB detects that the UE is not uplink time aligned or that the UE has become non-synchronized with downlink, it may transmit an indication message to a positioning node (the message may also indicate the reason, e.g., the UL time misalignment, lost connection due to inability to synchronize, etc.); the indication may also comprise a frequency or carrier or component carrier information. The eNodeB may discover the loss of timing alignment of the UE, e.g., by using one or more timer or by receiving a random access (RA) message associated with the UE since the UE may attempt an uplink Time Alignment using RA Procedure. The positioning node, being informed about an interruption or a complete stop in UE transmissions due to this timing misalignment issue (note that when the timeAlignmentTimer expires, the UE flushes all HARQ buffers, notifies RRC to release PUCCH/SRS and clears any configured downlink assignments and uplink grants, etc.) may further inform the LMU or instruct the LMU to stop performing the corresponding uplink measurements (e.g., for the UE being positioned in general or for UE uplink transmissions on a specific carrier); the reason may also be indicated to the LMU. The measuring node (e.g., LMU or eNodeB) may stop performing the uplink measurements temporarily (e.g., until the UL time alignment is restored), may break the uplink measurements and report the obtained measurement so far (e.g., always, or when the measurement time has been above a threshold or a sufficient number of measurement samples has been obtained so far) or may report a failure (e.g., always, or when the time or the number of samples is below a threshold).

In another example, the first node, upon receiving information related to transmit timing adjustment, may also start a timer (e.g., similar to timeAlignmentTimer). The timer may be used, for example, to determine when the UE may become timing misaligned, unless a new information related to transmit timing adjustment is received. In one embodiment, the second node may not provide the information if the (absolute) amount of timing adjustment does not exceed a threshold, but there may be a rule that the first node should receive the information related to transmit timing adjustment at least once until the timer reached a maximum period or the uplink measurements may be completed when the timer expires.

In yet another example, an LMU may adjust radio signal sampling based on the information related to transmit timing adjustment (e.g., the sampling periodicity may be aligned with TA command period or timing adjustment information update period, even when SRS is configured more often). In some examples, additionally to TA command period or the timing adjustment information update period, SRS measurement sampling may also depend on an activity pattern of the transmitting node and/or measuring node (e.g., DRX or DTX).

Any of the actions and procedures described herein (e.g., compensation applied to the positioning result or timing measurement) may also account for, e.g., does not include, a timing advance offset associated with downlink and uplink subframe timing relation such as for the offset with TDD or HD-FDD.

According to several embodiments, a measuring node (e.g., a wireless device, LMU, eNodeB, etc.) reports its capability to another network node (e.g., a positioning node), indicating that it is capable of applying a compensation to a timing measurement in order to account for the wireless device transmit timing adjustment, where the timing measurement is performed by using at least a signal transmitted by the wireless device. The capability information may also indicate that the measuring node is capable of applying a specific type of compensation related to wireless device transmit timing adjustment to a timing measurement, e.g., only compensation to adjustment related to TA.

The reported/signaled capability may also contain additional information. For example it may indicate that the measuring node is capable of applying compensation:

to all timing measurements supported by the measuring node or to a specific set of timing measurements (e.g., only to those measurements involving a UE-transmitted signal) or only to timing measurements used for positioning (e.g., RTOA, UE or eNB Rx-Tx time difference, etc.), to timing measurements performed only in the single-carrier case, to timing measurements performed in transmission scenarios involving single-carrier, multicarrier, CoMP, CoMP with carrier aggregation, MIMO, etc., to timing measurements when a single TAG or multi-TAG is used, up to a certain number of timing measurements performed in parallel.

When the measuring node is a radio network node, it may send its capability information to another network node in any of the following manners:

proactive reporting without receiving any explicit request from another network node (e.g., a positioning node, a neighboring or any target network node, etc.)

reporting upon receiving any explicit request from another network node (e.g., a positioning node, a neighboring or any target network node, etc.)

the explicit request can be sent to another network node anytime or at any specific occasion. For example, the request for the capability reporting can be sent to another network node during initial setup, when positioning measurement or session starts etc.

When the measuring node is a wireless device, it may send the capability information to the network node in any of the following manners:

proactive reporting without receiving any explicit request from the network node (e.g., a positioning node, a serving or any target network node)

reporting upon receiving any explicit request from the network node (e.g., a positioning node, a serving or any target network node)

the explicit request can be sent to the UE by the network anytime or at any specific occasion. For example, the request for the capability reporting can be sent to the UE during initial setup or after a cell change (e.g., handover, RRC connection re-establishment, RRC connection release with redirection, PCell change in CA, PCC change in PCC, etc.), when a positioning session or measurement is started, etc.

In case of proactive reporting, the UE may report its capability during one or more of the following occasions:
- during initial setup or call setup, e.g., when establishing an RRC connection,
- during cell change, e.g., handover, primary carrier change in multi-carrier operation, PCell change in multi-carrier operation, RRC re-establishment, RRC connection release with redirection etc.

The network node receiving the capability information may use this for one or more management tasks related to timing measurements. In one example, the positioning node may decide, based on a capability of a measuring node, whether it performs the compensation to a timing measurement itself or requests the measuring node to apply the compensation when determining the position of the wireless device. In another example the positioning node may also use the measuring device capability to decide the type of timing measurements for positioning and/or type of positioning method. In yet another example, if a wireless device does not support this capability then a positioning node may not use UE-based positioning. Instead it may use a method where the position is estimated by the positioning node. In yet another example, the positioning node may also decide whether to use multi-carrier for positioning or not, depending upon whether a measuring node is capable of applying compensation on multiple carriers or not. In yet another example, the positioning node may decide to apply compensation to certain timing measurement itself and to another set of timing measurement by the measuring node, in the event that more than one timing measurements are used for positioning.

Solution Category 2—Methods for Obtaining and Using the Information Related to Transmit Timing Adjustment in a Multi-Carrier and/or Multi-RAT Network In this section, techniques for obtaining and using the information related to transmit timing adjustment in a multi-carrier and/or multi-RAT network are described. These techniques may be combined with any of the techniques described in the previous section or the sections that follow. For example, embodiments related to those solutions described for a single-carrier operation may also apply on each carrier or cell used in a multi-carrier (also known as "multi-cell") operation, or in any combination of multi-carrier/multi-cell and CoMP operation.

In the event of multi-carrier operation, when multiple TAG are used the compensation to account for UE timing adjustment on each uplink carrier is applied by the measuring node independently on a timing measurement performed on each configured carrier.

The wireless device does not transmit any signal on a SCell when the cell is deactivated in multi-carrier operation. In this case, a measuring node may extend the measurement period of a timing measurement performed on the signals transmitted on said SCell to account for the absence of signals due to deactivation of the SCell. This is explained by several examples:
- In one example, the measuring node may extend the measurement period to a pre-defined measurement period applicable to the case when a SCell is deactivated while measurement is performed.
- In another example, the measuring node may extend the pre-defined measurement period to a value proportional to the duration over which the SCell (on whose signal the measurement is done) is deactivated while the said measurement is performed, e.g.:
  a pre-defined measurement period×duration over which SCell is deactivated during measurement+SCell activation and/or deactivation time×number of times SCell is deactivated.
- In yet another example, the measuring node may extend the measurement period to a value dependent on (e.g., proportional to) the number of times the SCell is deactivated while the said measurement is performed, e.g.:
  pre-defined measurement period×number of times SCell is deactivated during measurement+SCell activation and/or deactivation time×number of times SCell is deactivated.

SCell activation and deactivation time is the duration required by the UE to activate a deactivated SCell and deactivate an activated SCell respectively.

The rules related to measurements when SCell is deactivated may apply to any type of radio measurements done by a measurement which uses signals on SCell, i.e., timing measurement, signal strength measurement, signal quality measurement, etc.

Solution Category 3—Pre-Defined Rules and Applicability to Requirements and Testing In this section, some rules for using the information related to transmit timing adjustment for positioning measurements are described. The techniques described in the previous sections may apply or may be combined with any embodiment described in this section.

When a compensation is applied by a node (e.g., a measuring node) on a timing measurement to account for uplink transmit timing adjustment applied by the wireless device, then the measuring node is expected to meet certain pre-defined requirements. For example, it may be required to report said measurements within a certain time, to comply with a certain pre-defined measurement accuracy level (e.g. within +/−T2 seconds). In another example, it may also be required that the measuring node applies compensation to a certain number of timing measurements performed in parallel, e.g., up to at least 4 measurements on each carrier.

In yet another example, a pre-defined measurement requirement (e.g., accuracy requirement or measurement time requirement) may have to be met under one or more additional conditions, e.g., any one or more of:
- when the number of timing adjustments during the measurement period does not exceed a certain number N,
- when the total amount of transmit timing adjustment (e.g., aggregate TA described above) does not exceed a certain amount (e.g., X microseconds),
- when the transmit timing adjustment is not performed more frequently than with a certain interval T3; in one example, the interval may also relate to the signal transmit periodicity (e.g., T3 may be a function of a certain number K of SRS transmit time occasions, e.g., K=1 or K=5 with SRS transmission periodicity of 2 milliseconds may give T3 of 2 milliseconds or 10 milliseconds, respectively),
- when a certain timing advance offset is applied (e.g., no offset, offset corresponding to downlink and uplink subframe timing relation in TDD [See 3GPP TS 36.211], or offset corresponding to downlink and uplink subframe timing relation in HD-FDD, as described above),
- when timing advance offset is known (e.g., to the measuring node and/or positioning node and/or eNodeB), when autonomous timing advance is not used.

In some examples, it may also be required that a measuring node applies a timing compensation based on the information related to transmit timing adjustment within a certain period (e.g., not later than six subframes after the information has been received).

Different pre-defined rules and/or different parameters described above may be specified, e.g.:
  when a wireless device is configured with carrier aggregation and without carrier aggregation,
  when single TA or multi-TA are used,
  when the measuring node performs measurements on R1 and R2 carriers concurrently for the same or different UE (e.g., R1=1 and R2>1),
  for different RATs,
  for different duplex mode configuration (e.g., for FDD and TDD or for FDD and HD-FDD).

The requirements may apply with or without assuming a certain pre-defined timing advance relation between serving cells of the UE (e.g., same timing advance for all serving cells for UEs configured with CA).

The methods described above, e.g., the methods of compensating a timing measurement, methods of reporting a measuring node capability described in preceding sections, methods of meeting a pre-defined requirement (e.g., as described above) may also be configured in a test equipment (TE) node, also known as a system simulator (SS) or test system (TS). The TE or SS will have to implement all configuration methods related to embodiments applicable to different nodes, e.g., a wireless device, a serving radio node, a positioning node, a standalone measuring node such as an LMU, etc., to verify pre-defined requirements and procedures described in preceding sections.

The purpose of the test is to verify that the radio nodes, measuring node, wireless device, positioning node, etc., are compliant to the pre-defined rules, protocols, signaling and requirements associated with the compensation applied to the timing measurements. Typically the TE or SS or TS separately performs tests for UE and radio network nodes.

The testing may be measurement-specific and may be capability-dependent. For example, requirements described in preceding section may be verified with such TE or SS.
  For UE testing, the TE or SS will also be capable of:
  Receiving the measurement results from a measuring node,
  Analyzing the received results, e.g., comparing the measurement result or the statistics of the measurement results (e.g., with 90% confidence) obtained in the test with the reference results to determine whether measuring device is compliant to the requirements or not. The reference can be based on the pre-defined requirements or UE behavior or theoretical estimate or performed by a reference device. The reference device can be part of TE or SS.

Methods for Handling Timing Measurements

In view of the detailed techniques described above, it will be appreciated that FIG. 8A is a process flow diagram that illustrates a generalized method for handling timing measurements used for positioning, according to several of the techniques detailed herein. This method can be implemented at any of several nodes, as demonstrated by the detailed techniques described above. As shown at block 810, the illustrated method begins with obtaining one or more timing measurement values for timing measurements performed on radio signals transmitted by a wireless device. As shown at block 820, information related to one or more transmit timing adjustments applied to radio signal transmissions by a wireless device is also obtained. Finally, as shown at block 830, one or more of the timing measurement values are compensated with a compensation value, based on the obtained information related to the one or more transmit timing adjustments applied by the wireless device. In some embodiments, the compensating comprises applying a compensation to one or more of the timing measurements, which compensation is equal to an aggregated transmit timing adjustment.

In some embodiments, obtaining the information related to one or more transmit timing adjustments comprises receiving the information from a second node. In some of these embodiments, this information is received from a wireless device, which may be the wireless device that applied transmit timing adjustments to the measured signals. In other embodiments, the information related to the one or more transmit timing adjustments applied to transmissions by the wireless device comprises is received from a base station controlling the wireless device. As discussed above, other possibilities exist, including that the information is relayed through one or more nodes.

Figure 8A:
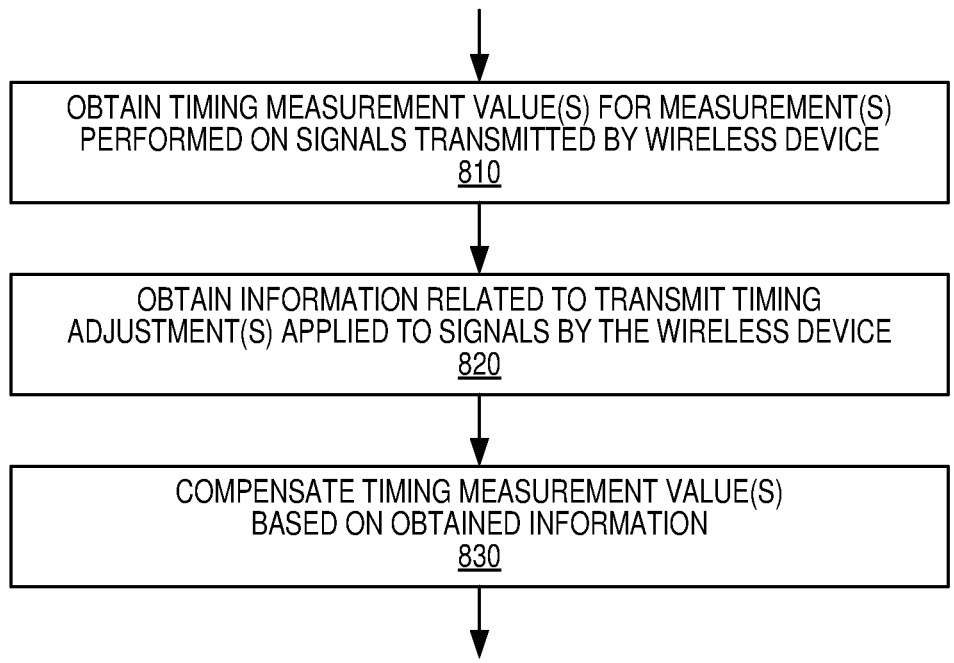
FIGS. 8A and 8B illustrate example processes for handling timing measurements used for positioning in a wireless communication network.
Figure 8B:
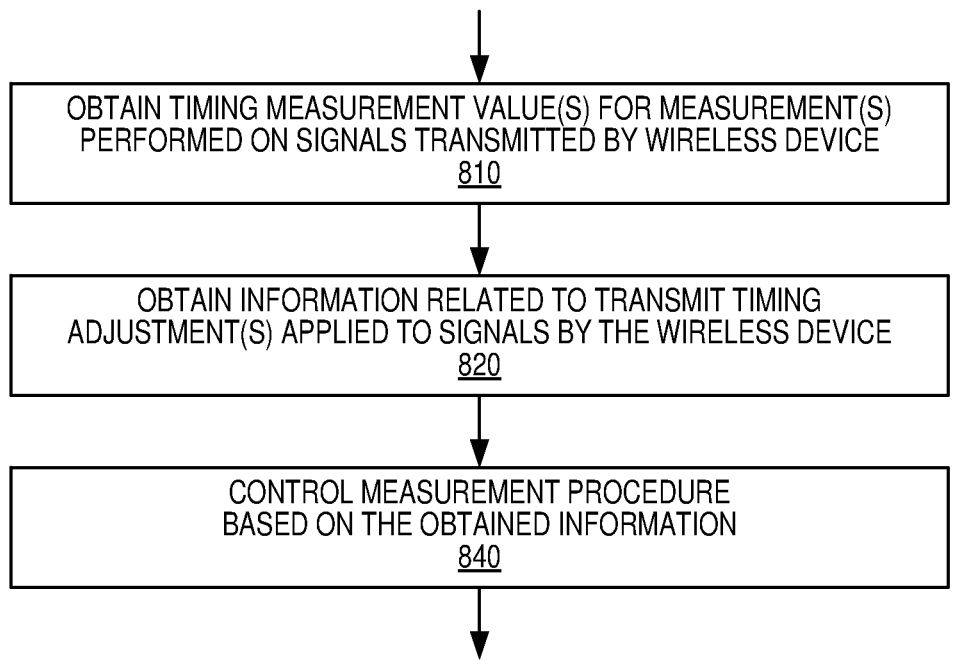

FIG. 8B illustrates an alternative method for handling timing measurements used for positioning. The illustrated method includes duplicates of the blocks 810 and 820 that were shown in FIG. 8A. In FIG. 8B, however, the method further includes controlling a measurement procedure based on the obtained information, as shown at block 840. It should be appreciated that the technique illustrated in FIG. 8B can be combined with that shown in FIG. 8A, in some embodiments, such that both the illustrated compensating and controlling operations are performed.

In some embodiments, the controlling of the measurement procedure shown at block 840 comprises one or more of: deciding whether to restart measurements, deciding whether to continue measurements, and discarding the obtained one or more timing measurements. In some of these embodiments, the controlling is based on a comparison between an aggregated timing adjustment applied by the wireless device and a threshold.

In other embodiments, the controlling comprises one or more of: configuring one or more uplink measurements based on the obtained information and adapting the measurement procedure, based on the obtained information. Configuring one or more uplink measurements may comprise suggesting a search window for uplink measurements, in some embodiments, based on the obtained information. Likewise, in some embodiments, configuring one or more uplink measurements may comprise grouping measurements at the measuring node, based on the obtained information.

In any of the methods illustrated in FIGS. 8A and 8B and their variants, the controlling or compensating, or both, may be based on determining whether the wireless device is time-aligned or synchronized during the measurement, based on the obtained information. In some embodiments, the timing measurements include any one or more of: a propagation delay measurement, a UTDOA measurement, an E-CID measurement, a UE Rx-Tx measurement, an eNB Rx-Tx measurement, an RTT measurement, a TOA measurement, and a TDOA measurement.

Some embodiments of the illustrated methods further include one or more of: using a compensated measurement for position calculation; using a compensated measurement in a positioning-related database; differentiating a compensated measurement from a measurement without using a timing adjustment; and signaling the obtained information to the node performing the measurement or to a positioning node.

In some embodiments, obtaining the one or more timing measurements comprises performing the one or more timing measurements.

The one or more transmit timing adjustments may comprise any one or more of the following, in some embodiments: a timing adjustment applied in response to a timing advance command; a timing adjustment associated with a Timing Advance Group; an autonomous timing adjustment applied by the wireless device; a timing adjustment associated with a duplex configuration; and a timing advance offset. In some embodiments, the obtained information related to one or more transmit timing adjustments comprises any one or more of: an indication that at least one timing adjustment has been applied; a type of timing adjustment; a total amount of or an aggregate timing adjustment; a number of timing adjustments; a frequency of the time adjustment; a time interval associated with the time adjustment; a timing adjustment comprised in a timing advance command; information about one or more Timing Advance Groups; capability associated with timing adjustment; time alignment or misalignment indication; and information about uncertainty or quality of transmit timing adjustment. In some of these embodiments, the obtained information related to one or more transmit timing adjustments comprises information related to timing adjustments applied to each of two or more timing advance groups.

In some embodiments, compensating one or more positioning measurements performed on transmissions by the wireless device is performed independently for measurements performed on each of two or more carriers belonging to different timing advance groups.

The methods illustrated in FIGS. 8A and 8B, and variants thereof, may further comprise reporting a capability for the first node to the second node, in some embodiments, where the capability indicates that the first node is capable of compensating positioning measurements or positioning results, or both, based on information related to one or more transmit timing adjustments applied to transmissions by a wireless device. Correspondingly, some methods may further include receiving a capability report from a second node, the capability indicating that the second node is capable of compensating positioning measurements or positioning results, or both, based on information related to one or more transmit timing adjustments applied to transmissions by a wireless device. In some of these embodiments, compensating one or more positioning measurements performed on transmissions by the wireless device or positioning results for the wireless device, or adjusting the performing of measurements on transmissions by the wireless device, or both, based on the obtained information, is further based on the received capability report. In others of these embodiments, the information related to one or more transmit timing adjustments applied to transmissions by the wireless device is selectively forwarded, based on the received capability report.

Hardware Implementations

Figure 2:
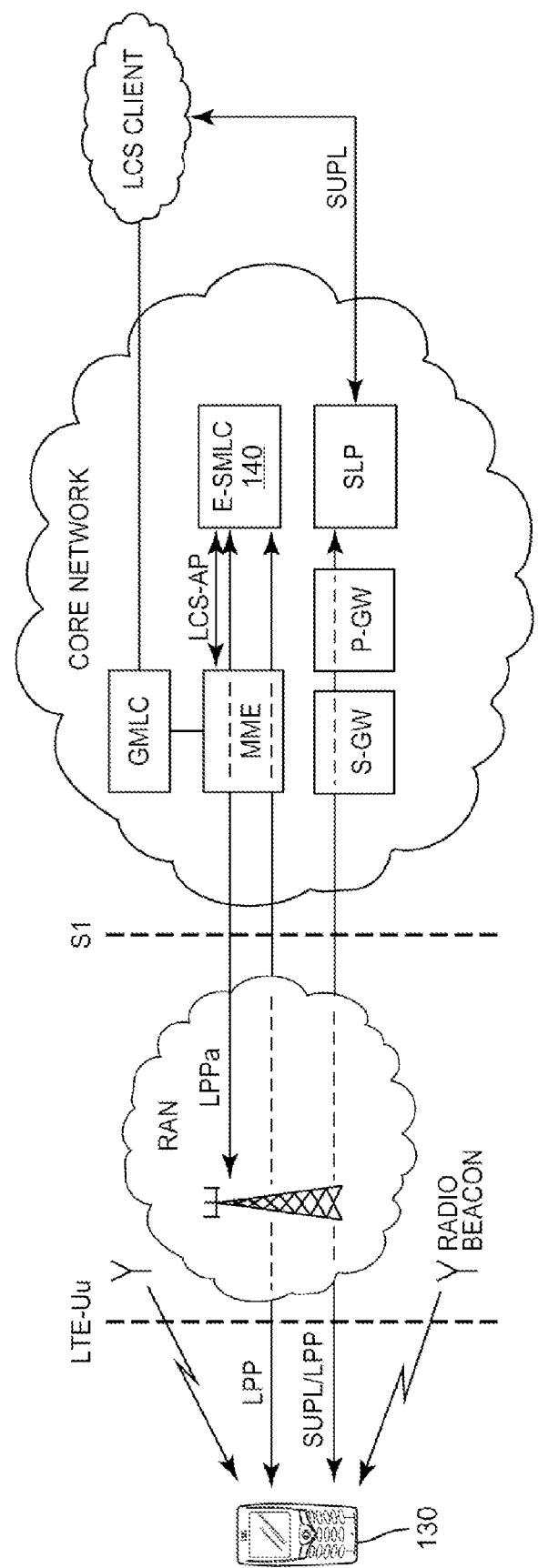
FIG. 2 illustrates several nodes in an example network configured according to the LTE positioning architecture for downlink positioning.
Figure 6:
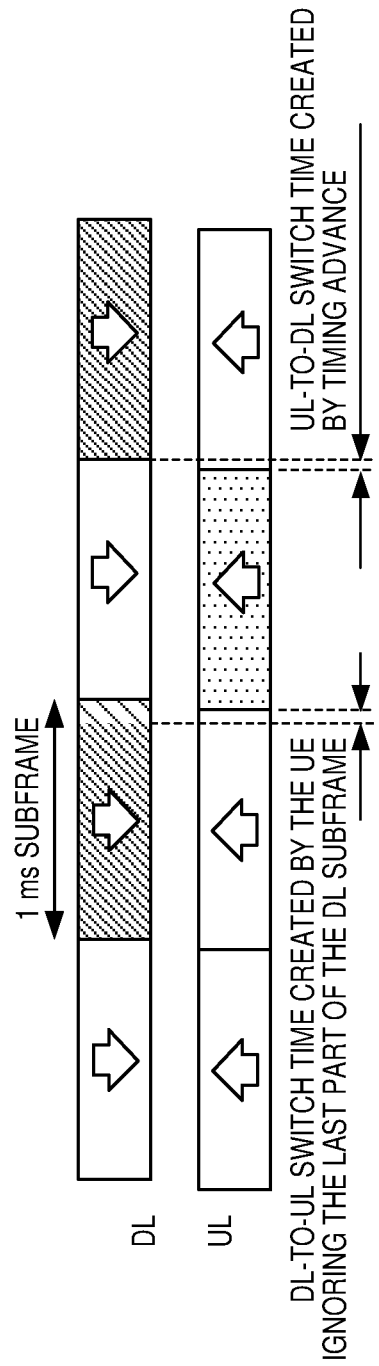
FIG. 6 illustrates a subframe timing relationship for half-duplex FDD operation.

Although the techniques described above may be implemented in any appropriate type of telecommunication system, supporting any suitable communication standards and using any suitable components, particular embodiments of the described solutions may be implemented in an LTE network, such as in any of several of the nodes illustrated in FIGS. 1 and 2. The example network may further include any additional elements suitable to support communication between wireless devices or between a wireless device and another communication device (such as a landline telephone). Although each of the illustrated network nodes in FIGS. 1 and 2 may represent a network communication device that includes any suitable combination of hardware and/or software, these network nodes may, in particular embodiments, represent a device such as the example network node 900 illustrated in FIG. 9. Similarly, although the illustrated base station nodes may represent network nodes that includes any suitable combination of hardware and/or software, these network nodes may, in particular embodiments, represent devices such as the example network node 940 illustrated in greater detail by FIG. 10.

Figure 9:
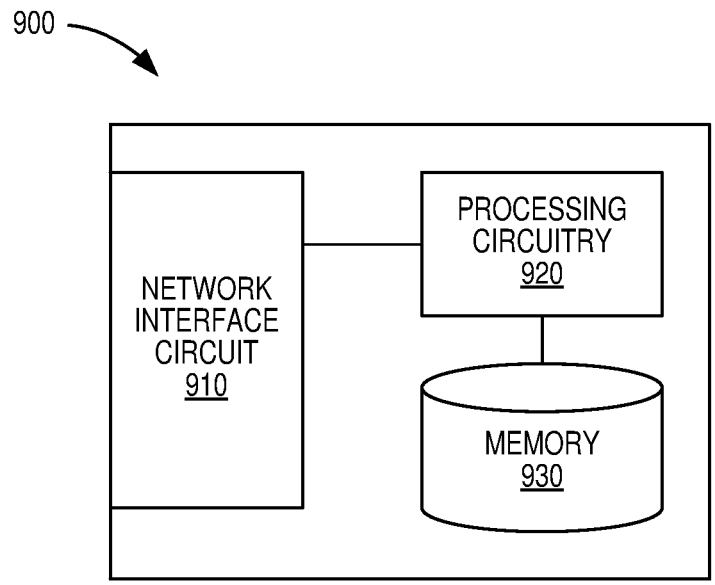
FIG. 9 illustrates an example network node according to several embodiments of the invention.

As shown in FIG. 9, the example network node 900 includes processing circuitry 920, a memory 930, and network interface circuitry 910. In particular embodiments, some or all of the functionality described above as being provided by a network node may be provided by processing circuitry 920, executing instructions stored on a computer-readable medium, such as the memory 930 shown in FIG. 9. Alternative embodiments of the network node 900 may include additional components beyond those shown in FIG. 9 that may be responsible for providing certain aspects of the node's functionality, including any of the functionality described above and/or any functionality necessary to support the solutions described above.

More particularly, embodiments of the present invention include positioning nodes, measuring nodes, and radio base station nodes, each having a configuration generally like that illustrated in FIG. 9, e.g., including a network interface 910 adapted for communication with one or more other network nodes as well as processing circuitry 920, where the processing circuitry 920 is adapted to, for example, obtain timing measurement values for timing measurements performed on radio signals transmitted by a wireless device, or information related to one or more transmit timing adjustments applied to radio signal transmissions by a wireless device, or both, and to use the information according to one of the techniques detailed above.

Processing circuit 920 may include one or more microprocessors or microcontrollers, as well as other digital hardware, which may include digital signal processors (DSPs), special-purpose digital logic, and the like. Either or both of the microprocessor(s) and the digital hardware may be configured to execute program code stored in memory, along with radio parameters. The program code stored in this memory, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the several techniques described above. Because the various details and engineering tradeoffs associated with the design of baseband processing circuitry for wireless base stations and other wireless devices are well known and are unnecessary to a full understanding of the invention, additional details are not shown here.

Accordingly, in various embodiments of the invention, processing circuits, such as the processing circuits 920 of FIG. 9, are configured to carry out one or more of the techniques described above for assisting in uplink positioning of a target wireless device. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module.

Figure 10:
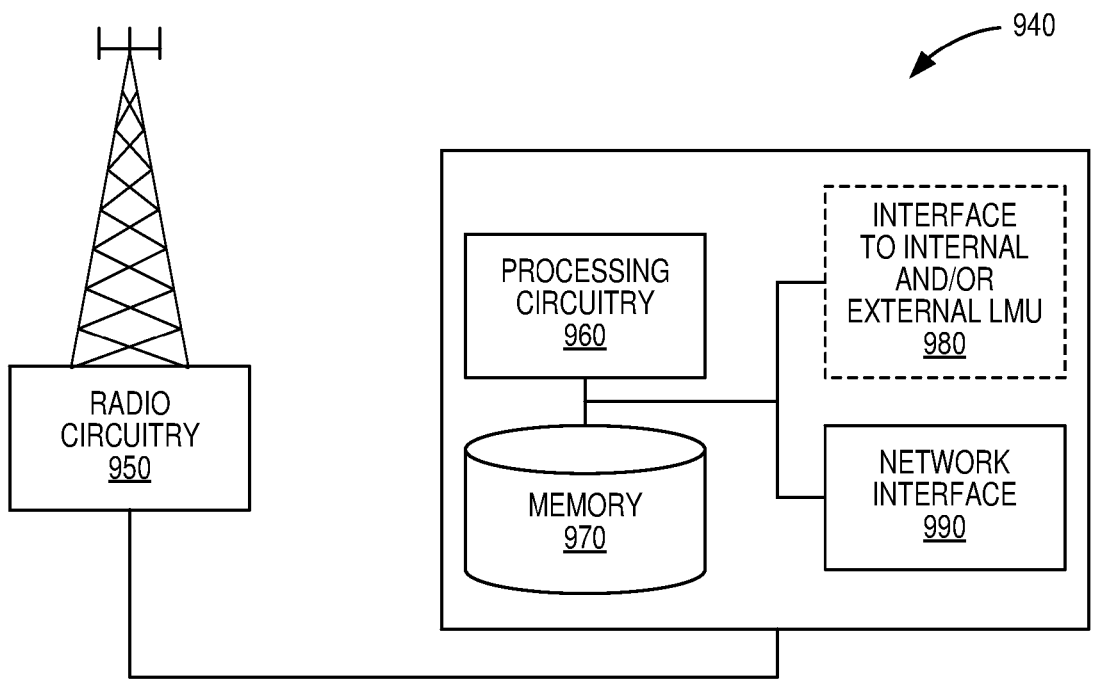
FIG. 10 illustrates an example radio network node according to several embodiments of the invention.

A variant of the network node 900 illustrated in FIG. 9 is shown in FIG. 10. Here, the illustrated network node is a radio network node 940. The example radio network node 940 shown in FIG. 10 includes processing circuitry 960, a memory 970, radio circuitry 950, and a network interface 990. The processing circuitry 960 may comprise additional radio-frequency circuitry and baseband processing circuitry (not shown). In particular embodiments, some or all of the functionality described above as being provided by a mobile base station, a base station controller, a relay node, a NodeB, an enhanced NodeB, an LMU, and/or any other type of mobile communications node may be provided by the processing circuitry 960 executing instructions stored on a computer-readable medium, such as the memory 970 shown in FIG. 10. Alternative embodiments of the network node 940 may include additional components responsible for providing additional functionality, including any of the functionality identified above and/or any functionality necessary to support the solution described above.

The radio network node 940 of FIG. 10 may be configured to operate as a base station according to Release 11 specifications for LTE, in some cases. In general, a base station communicates with access terminals and is referred to in various contexts as an access point, Node B, Evolved Node B (eNodeB or eNB) or some other terminology. Although the various base stations discussed herein are generally described and illustrated as though each base station is a single physical entity, those skilled in the art will recognize that various physical configurations are possible, including those in which the functional aspects discussed here are split between two physically separated units. Thus, the term "base station" is used herein to refer to a collection of functional elements (one of which is a radio transceiver that communicates wirelessly with one or more mobile stations), which may or may not be implemented as a single physical unit.

In some cases, radio network node 940 includes an additional interface 980, adapted for communications with an internal or external LMU function, or both. This additional interface 980 may include circuitry and/or programmed logic that is additional to network interface 990, in some cases, or may comprise functionality added to the circuitry and/or programmed logic used to implement network interface 990. When configured as a base station, radio network node 940 may include an integrated LMU, or may share one or more components with an LMU, and/or may communicate with a standalone LMU via additional interface 980. In any of these cases, the processing circuitry 960 may be further configured to carry out the necessary communications between the base station functionality of radio network node 940 and the LMU functionality.

In other embodiments, radio network node 940 of FIG. 10 is configured to operate as an LMU or other radio signal measurement unit. In this case, radio network node 940 may include radio circuitry 950 that is adapted only for receiving and measuring uplink transmissions from UEs, in some cases. As noted earlier, an LMU may be integrated with an eNodeB, or share one or more components with an eNodeB, or may be standalone; in any of these cases, an LMU configured as shown in FIG. 10 is adapted to communicate with an eNodeB and/or a positioning node, e.g., using network interface 990.

Referring again to FIG. 10, it should be appreciated that radio circuitry 950 includes receiver circuits and/or transmitter circuits that use known radio processing and signal processing components and techniques, typically according to a particular telecommunications standard such as the 3GPP standard for LTE and/or LTE-Advanced. In some cases, radio network node may be a measurement node that includes only radio receiver circuitry, and not radio transmitter circuits. In either case, because the various details and engineering trade-offs associated with the design and implementation of such circuitry are well known and are unnecessary to a full understanding of the invention, additional details are not shown here.

Processing circuitry 960 may include one or more microprocessors or microcontrollers, as well as other digital hardware, which may include digital signal processors (DSPs), special-purpose digital logic, and the like. Either or both of the microprocessor(s) and the digital hardware may be configured to execute program code stored in memory, along with radio parameters. The program code stored in this memory, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the several techniques described above. Again, because the various details and engineering tradeoffs associated with the design of processing circuitry for wireless base stations and other wireless devices are well known and are unnecessary to a full understanding of the invention, additional details are not shown here.

Accordingly, in various embodiments of the invention, processing circuits, such as the processing circuits 960 of FIG. 10, are configured to carry out one or more of the techniques described above for assisting in the positioning of a target wireless device. In some cases, these processing circuits are configured with appropriate program code, stored in one or more suitable memory devices, to implement one or more of the techniques described herein. Of course, it will be appreciated that not all of the steps of these techniques are necessarily performed in a single microprocessor or even in a single module. It will be appreciated that the functions in several of the techniques and methods described above may be implemented using electronic data processing circuitry provided in a UE or similar wireless device. Each UE, of course, also includes suitable radio circuitry for receiving and transmitting radio signals formatted in accordance with known formats and protocols, e.g., LTE formats and protocols.

Figure 11:
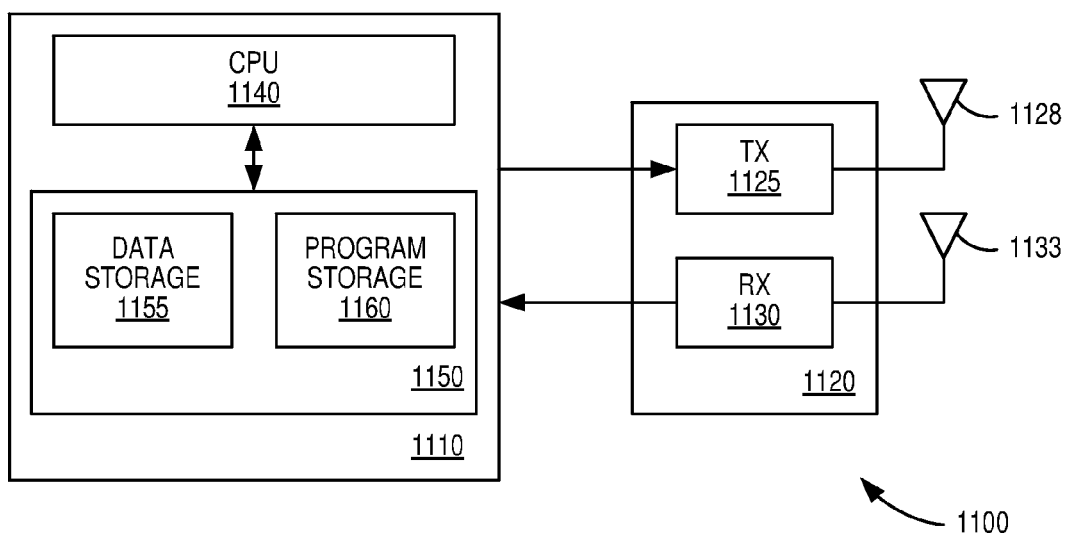
FIG. 11 illustrates an example wireless device according to several embodiments of the invention.

FIG. 11 illustrates features of an example wireless device 1100 according to several embodiments of the present invention. The illustrated wireless device may be adapted to carry out one or several of the techniques described above for handling timing measurements used for positioning.

UE 1100 comprises a transceiver 1120 for communicating with one or more base station, as well as a processing circuit 1110 for processing the signals transmitted and received by the transceiver 1120. Transceiver 1120 includes a transmitter 1125 coupled to one or more transmit antennas 1128 and receiver 1130 coupled to one or more receive antennas 1133. The same antenna(s) 1128 and 1133 may be used for both transmission and reception. Receiver 1130 and transmitter 1125 use known radio processing and signal processing components and techniques, typically according to a particular telecommunications standard such as the 3GPP standards for LTE and/or LTE-Advanced. Because the various details and engineering tradeoffs associated with the design and implementation of such circuitry are well known and are unnecessary to a full understanding of the invention, additional details are not shown here.

Processing circuit 1110 comprises one or more processors 1140, hardware, firmware or a combination thereof, coupled to one or more memory devices 1150 that make up a data storage memory 1155 and a program storage memory 1160. Memory 1150 may comprise one or several types of memory such as read-only memory (ROM), random-access memory, cache memory, flash memory devices, optical storage devices, etc. Again, because the various details and engineering tradeoffs associated with the design of baseband processing circuitry for UEs and similar wireless devices are well known and are unnecessary to a full understanding of the invention, additional details are not shown here.

Typical functions of the processing circuit 1110 include modulation and coding of transmitted signals and the demodulation and decoding of received signals. In several embodiments of the present invention, processing circuit 1110 is adapted, using suitable program code stored in program storage memory 1160, for example, to carry out one or several of the techniques described above. Of course, it will be appreciated that not all of the steps of these techniques are necessarily performed in a single microprocessor or even in a single module.

Several advantages may be achieved using the various techniques and apparatus described above. Some of the advantages that can be envisioned with several embodiments of the described techniques and apparatus are as follows:

The accuracy of timing measurement is improved by the virtue of compensation applied to account for timing adjustment of UE transmit timing. This in turn improves the positioning accuracy.

The timing measurements on multiple carriers can be used for positioning even when different TA are applied on different cells in multi-carrier operation where carriers are located in non-co-located sites.

The pre-defined requirements and testing procedures ensure that timing measurements are performed while fulfilling certain pre-defined performance.

Ensuring correct timing measurement compensation in different duplex modes, including HD-FDD, DL FDD band, etc.

It will be appreciated by the person of skill in the art that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

What is claimed is:

1. A method, in a first node in a wireless communications network, for handling a timing measurement used for positioning, wherein the method comprises:
   obtaining, one or more timing measurement values for timing measurements performed on radio signals transmitted by a wireless device;
   obtaining information related to one or more transmit timing adjustments applied to radio signal transmissions by the wireless device, wherein the one or more transmit timing adjustments comprise any one or more of an autonomous timing adjustment applied by the wireless device and a timing adjustment associated with a duplex configuration; and
   compensating one or more of the timing measurement values with a compensation value based on the obtained information related to the one or more transmit timing adjustments applied by the wireless device.

2. The method of claim 1, wherein obtaining the information related to one or more transmit timing adjustments comprises receiving the information from a second node.

3. The method of claim 2, wherein obtaining the information related to the one or more transmit timing adjustments applied to radio signal transmissions by the wireless device comprises receiving the information from the wireless device.

4. The method of claim 2, wherein obtaining the information related to the one or more transmit timing adjustments applied to radio signal transmissions by the wireless device comprises receiving the information from a base station controlling the wireless device.

5. The method of claim 2, wherein the method further comprises controlling a measurement procedure based on the obtained information.

6. The method of claim 5, wherein said controlling comprises any of: deciding whether to restart measurements, deciding whether to continue measurements, and discarding the obtained one or more timing measurements.

7. The method of claim 6, wherein said controlling is based on a comparison between an aggregated timing adjustment applied by the wireless device and a threshold.

8. The method of claim 5, wherein said controlling comprises at least one of:
   configuring one or more uplink measurements based on the obtained information; and
   adapting the measurement procedure, based on the obtained information.

9. The method of claim 8, wherein configuring one or more uplink measurements comprises suggesting a search window for uplink measurements, based on the obtained information.

10. The method of claim 8, wherein configuring one or more uplink measurements comprises grouping measurements, based on the obtained information.

11. The method of claim 5, wherein said controlling or compensating, or both, is based on determining whether the wireless device is time-aligned or synchronized during the measurement, based on the obtained information.

12. The method of claim 1, wherein the timing measurements include any one or more of: a propagation delay measurement, a UTDOA measurement, an E-CID measurement, a UE Rx-Tx measurement, an eNB Rx-Tx measurement, an RTT measurement, a TOA measurement, and a TDOA measurement.

13. The method of claim 1, wherein the compensating comprises applying a compensation to one or more of the timing measurements, which compensation is equal to an aggregated transmit timing adjustment applied by the wireless device.

14. The method of claim 1, further comprising one or more of:
   using a compensated measurement for position calculation;
   using a compensated measurement in a positioning-related database;
   differentiating a compensated measurement from a measurement without using a timing adjustment; and
   signaling the obtained information to the node performing the measurement or to a positioning node.

15. The method of claim 1, wherein obtaining the one or more timing measurements comprises performing the one or more timing measurements.

16. The method of claim 1, wherein the one or more transmit timing adjustments comprise any one or more of:
   a timing adjustment applied in response to a timing advance command;
   a timing adjustment associated with a Timing Advance Group; and
   a timing advance offset.

17. The method of claim 1, wherein the obtained information related to one or more transmit timing adjustments comprises any one or more of:
   an indication that at least one timing adjustment has been applied;
   a type of timing adjustment;
   a total amount of or an aggregate timing adjustment;
   a number of timing adjustments;
   a frequency of the time adjustment;
   a time interval associated with the time adjustment;
   a timing adjustment comprised in a timing advance command;
   information about one or more Timing Advance Groups;
   capability associated with timing adjustment;
   time alignment or misalignment indication; and
   information about uncertainty or quality of transmit timing adjustment.

18. The method of claim 17, wherein the obtained information related to one or more transmit timing adjustments comprises information related to timing adjustments applied to each of two or more timing advance groups.

19. The method of claim 1, wherein said compensating one or more of the timing measurements is performed independently for measurements performed on each of two or more carriers belonging to different timing advance groups.

20. The method of claim 1, further comprising reporting a capability for the first node to a second node, the capability indicating that the first node is capable of compensating positioning measurements or positioning results, or both, based on information related to one or more transmit timing adjustments applied to transmissions by a wireless device.

21. The method of claim 1, further comprising receiving a capability report from a second node, the capability indicating that the second node is capable of compensating positioning measurements or positioning results, or both, based on information related to one or more transmit timing adjustments applied to transmissions by the wireless device.

22. The method of claim 21, wherein said compensating one or more of the timing measurements, or both, based on the obtained information, is further based on the received capability report.

23. The method of claim 21, further comprising selectively forwarding said information related to one or more transmit timing adjustments applied to transmissions by the wireless device, based on the received capability report.

24. A node in a wireless communication system, the node comprising a network interface circuit adapted for communication with one or more other nodes in the wireless communication system and a processing circuit, wherein the processing circuit is configured to:
   obtain one or more timing measurement values for timing measurements performed on radio signals transmitted by a wireless device;
   obtain information related to one or more transmit timing adjustments applied to radio signal transmissions by the wireless device, wherein the one or more transmit timing adjustments comprise any one or more of an autonomous timing adjustment applied by the wireless device and a timing adjustment associated with a duplex configuration; and
   compensate one or more of the timing measurement values with a compensation value based on the obtained information related to the one or more transmit timing adjustments applied by the wireless device.

25. The node of claim 24, wherein the processing circuit is adapted to obtain the information related to one or more transmit timing adjustments by receiving the information from a second node.

26. The node of claim 25, wherein the processing circuit is adapted to obtain the information related to one or more transmit timing adjustments by receiving the information from the wireless device.

27. The node of claim 26, wherein the processing circuit is further adapted to perform at least one of the following:
   using a compensated measurement for position calculation;
   using a compensated measurement in a positioning-related database;
   differentiating a compensated measurement from a measurement without using a timing adjustment; and
   signaling the obtained information to the node performing the measurement or to a positioning node.

28. The node of claim 25, wherein the processing circuit is adapted to obtain the information related to one or more transmit timing adjustments by receiving the information from a base station controlling the wireless device.

29. The node of claim 25, wherein the processing circuit is further adapted to control a measurement procedure based on the obtained information.

30. The node of claim 29, wherein the processing circuit is adapted to control the measurement procedure by performing any of: deciding whether to restart measurements, deciding whether to continue measurements, discarding the obtained one or more timing measurements.

31. The node of claim 29, wherein the processing circuit is adapted to control the measurement procedure by configuring one or more uplink measurements based on the obtained information, or adapting the measurement procedure, based on the obtained information, or both.

32. The node of claim 24, wherein the processing circuit is adapted to obtain the one or more timing measurement values by performing the one or more timing measurements.

33. The node of claim 24, wherein the one or more transmit timing adjustments comprise any one or more of:
   a timing adjustment applied in response to a timing advance command;
   a timing adjustment associated with a Timing Advance Group; and
   a timing advance offset.

34. The node of claim 24, wherein the obtained information related to one or more transmit timing adjustments comprises any one or more of:
- an indication that at least one timing adjustment has been applied;
- a type of timing adjustment;
- a total amount of or an aggregate timing adjustment;
- a number of timing adjustments;
- a frequency of the time adjustment;
- a time interval associated with the time adjustment;
- a timing adjustment comprised in a timing advance command;
- information about one or more Timing Advance Groups;
- capability associated with timing adjustment;
- time alignment or misalignment indication; and
- information about uncertainty or quality of transmit timing adjustment.

35. The node of claim 34, wherein the obtained information related to one or more transmit timing adjustments comprises information related to timing adjustments applied to each of two or more timing advance groups.

36. The node of claim 24, wherein the processing circuit is adapted to compensate the one or more positioning measurements independently for measurements performed on each of two or more carriers belonging to different timing advance groups.

37. The node of claim 24, wherein the processing circuit is further adapted to report a capability for the node to a second node, the capability indicating that the first node is capable of compensating positioning measurements or positioning results, or both, based on information related to one or more transmit timing adjustments applied to transmissions by the wireless device.

38. The node of claim 24, wherein the processing circuit is further adapted to receive a capability report from a second node, the capability indicating that the second node is capable of compensating positioning measurements or positioning results, or both, based on information related to one or more transmit timing adjustments applied to transmissions by the wireless device.

39. The node of claim 38, wherein the processing circuit is further adapted to selectively forward said information related to one or more transmit timing adjustments applied to transmissions by the wireless device, based on the received capability report.

40. A method, in a first user equipment in a wireless communications network, for handling positioning measurements, wherein the method comprises:
- obtaining one or more timing measurement values for timing measurements performed on radio signals transmitted by a second user equipment, the second user equipment differing from the first user equipment;
- obtaining information related to one or more transmit timing adjustments applied to radio signal transmissions by the second user equipment, wherein the one or more transmit timing adjustments comprise any one or more of an autonomous timing adjustment applied by the second user equipment and a timing adjustment associated with a duplex configuration; and
- transmitting the obtained information to the positioning node or another device.

41. A method, in a first wireless device in a wireless communications network, for handling positioning measurements, wherein the method comprises:
- obtaining one or more timing measurement values for timing measurements performed on radio signals transmitted by a second wireless device;
- obtaining information related to one or more transmit timing adjustments applied to radio signal transmissions by the second wireless device, wherein the one or more transmit timing adjustments comprise any one or more of an autonomous timing adjustment applied by the second wireless device and a timing adjustment associated with a duplex configuration; and
- compensating one or more of the obtained timing measurement values with a compensation value, based on the obtained information related to the one or more transmit timing adjustments applied by the second wireless device.

42. The method of claim 41, wherein the first wireless device and the second wireless device are the same and wherein obtaining the one or more timing measurement values comprises performing the one or more timing measurements.

* * * * *